(12) United States Patent
Aoyama et al.

(10) Patent No.: US 11,814,695 B2
(45) Date of Patent: Nov. 14, 2023

(54) METHOD FOR MANUFACTURING HIGH-STRENGTH GALVANIZED STEEL SHEET AND HIGH-STRENGTH GALVANIZED STEEL SHEET

(71) Applicant: JFE STEEL CORPORATION, Tokyo (JP)

(72) Inventors: Mai Aoyama, Tokyo (JP); Minoru Tanaka, Tokyo (JP); Yoshitsugu Suzuki, Tokyo (JP); Yoshiyasu Kawasaki, Tokyo (JP); Hideyuki Takahashi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 245 days.

(21) Appl. No.: 15/779,157

(22) PCT Filed: Nov. 8, 2016

(86) PCT No.: PCT/JP2016/004829
§ 371 (c)(1),
(2) Date: May 25, 2018

(87) PCT Pub. No.: WO2017/090236
PCT Pub. Date: Jun. 1, 2017

(65) Prior Publication Data
US 2018/0327884 A1    Nov. 15, 2018

(30) Foreign Application Priority Data

Nov. 26, 2015    (JP) ................................ 2015-230246

(51) Int. Cl.

| | |
|---|---|
| *C21D 9/46* | (2006.01) |
| *C23C 2/02* | (2006.01) |
| *C23C 2/06* | (2006.01) |
| *C22C 38/14* | (2006.01) |
| *C22C 38/60* | (2006.01) |
| *C21D 6/00* | (2006.01) |
| *C21D 8/02* | (2006.01) |
| *C22C 38/00* | (2006.01) |

(Continued)

(52) U.S. Cl.
CPC .............. *C21D 9/46* (2013.01); *B32B 15/013* (2013.01); *C21D 1/185* (2013.01); *C21D 1/76* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/0278* (2013.01); *C21D 8/0463* (2013.01); *C21D 8/0473* (2013.01); *C21D 9/48* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/38* (2013.01); *C22C 38/60* (2013.01); *C23C 2/02* (2013.01); *C23C 2/06* (2013.01); *C23C 2/40* (2013.01); *C21D 2211/001* (2013.01); *C21D 2211/005* (2013.01)

(58) Field of Classification Search
CPC .... C23C 2/40; C23C 2/06; C23C 2/02; C23C 28/023; C23C 14/14; C23C 2/28; C21D 9/46; C21D 8/0247; C21D 8/005; C21D 8/0226; C21D 8/0263; C21D 8/0205; C21D 8/02; C21D 8/0236; C21D 9/48; C22C 38/60; C22C 18/00; C22C 38/04; C22C 38/00; C22C 38/26; C22C 38/02; C22C 38/58; C22C 38/38
See application file for complete search history.

(56) References Cited

U.S. PATENT DOCUMENTS 6,410,163 B1 * 6/2002 Suzuki .................. C22C 38/001
428/659
6,517,955 B1 * 2/2003 Takada .................... C22C 38/02
428/659

(Continued)

FOREIGN PATENT DOCUMENTS

| EP | 1 076 105 A1 | 2/2001 |
| EP | 2 740 812 A1 | 6/2014 |

(Continued)

OTHER PUBLICATIONS

Feb. 14, 2017 International Search Report issued in Patent Application No. PCT/JP2016/004829.

(Continued)

*Primary Examiner* — Alexandra M Moore
*Assistant Examiner* — Austin Pollock
(74) *Attorney, Agent, or Firm* — Oliff PLC

(57) ABSTRACT

A high-strength galvanized steel sheet and a method for producing the steel sheet. The steel sheet has a composition that includes C: 0.030% to 0.250%, Si: 0.01% to 3.00%, Mn: 2.00% to 10.00%, P: 0.001% to 0.100%, S: 0.0001% to 0.0200%, N: 0.0005% to 0.0100%, Ti: 0.005% to 0.200%, on a mass basis, and Fe and inevitable impurities. Additionally, the steel sheet has concentration of solute Mn at a depth of 5 μm or less from a surface of the steel sheet that is 1.50% by mass or less, and a value obtained by dividing the average mass percentage of Mn in retained austenite by the average mass percentage of Mn in ferrite is 2.0 or more.

18 Claims, No Drawings

(51) Int. Cl.

| | |
|---|---|
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/16 | (2006.01) |
| C22C 38/28 | (2006.01) |
| C21D 8/04 | (2006.01) |
| C21D 9/48 | (2006.01) |
| C21D 1/76 | (2006.01) |
| C21D 1/18 | (2006.01) |
| B32B 15/01 | (2006.01) |
| C22C 38/38 | (2006.01) |
| C23C 2/40 | (2006.01) |

(56) References Cited

U.S. PATENT DOCUMENTS

| | | | |
|---|---|---|---|
| 2003/0054195 A1 | 3/2003 | Ishii et al. | |
| 2011/0083774 A1* | 4/2011 | Jin | C22C 38/50 148/533 |
| 2014/0230971 A1* | 8/2014 | Kawasaki | B32B 15/013 148/533 |
| 2014/0234658 A1* | 8/2014 | Nozaki | C22C 38/001 428/659 |
| 2014/0360632 A1* | 12/2014 | Hasegawa | C21D 8/0436 148/533 |
| 2015/0314568 A1* | 11/2015 | Takahashi | C22C 38/22 428/659 |
| 2017/0152580 A1* | 6/2017 | Kimura | C21D 8/0226 |

FOREIGN PATENT DOCUMENTS

| | | | |
|---|---|---|---|
| EP | 2 772 556 A1 | | 9/2014 |
| EP | 3 214 193 A1 | | 9/2017 |
| JP | S61-157625 A | | 7/1986 |
| JP | H07-070723 A | | 3/1995 |
| JP | 2000-109965 A | | 4/2000 |
| JP | 2001140021 A | * | 5/2001 |
| JP | 2001329340 A | * | 11/2001 |
| JP | 2003-277902 A | | 10/2003 |
| JP | 2005-008939 A | | 1/2005 |
| JP | 2008-024980 A | | 2/2008 |
| JP | 2008-266778 A | | 11/2008 |
| JP | 2010-255110 A | | 11/2010 |
| JP | 2013-76162 A | | 4/2013 |
| KR | 10-2014-0075789 A | | 6/2014 |
| WO | WO-2013061545 A1 * | 5/2013 | .......... C21D 8/0236 |
| WO | 2015/022778 A1 | | 2/2015 |
| WO | 2015/133061 A1 | | 9/2015 |
| WO | 2016/067626 A1 | | 5/2016 |

OTHER PUBLICATIONS

Aug. 24, 2018 Extended European Search Report issued in European Application No. 16868187.2.

Jun. 28, 2019 Office Action issued in Chinese Application No. 201680069188.2.

Feb. 17, 2020 Office Action issued in European Patent Application No. 16868187.2.

May 31, 2019 Office Action issued in Korean Application No. 10-2018-7014804.

* cited by examiner

METHOD FOR MANUFACTURING HIGH-STRENGTH GALVANIZED STEEL SHEET AND HIGH-STRENGTH GALVANIZED STEEL SHEET

TECHNICAL FIELD

The present disclosure relates to a method for manufacturing a high-strength galvanized steel sheet suitable for use in automotive parts applications, a method for manufacturing a hot-rolled steel sheet for high-strength galvanized steel sheets, a method for manufacturing a cold-rolled steel sheet for high-strength galvanized steel sheets, and a high-strength galvanized steel sheet.

BACKGROUND ART

In recent years, with the rising awareness of global environmental protection, improvements in fuel efficiency have been strongly required for reducing automotive $CO_2$ emissions. This has led to active attempts to reduce the thickness of automotive body parts by strengthening steel sheets, which are materials for automotive body parts, to reduce automobile weight. However, strengthening a steel sheet causes a reduction in formability. Therefore, a material having both high strength and high formability is expected to be developed.

In order to strengthen a steel sheet and in order to enhance the formability thereof, it is effective to add a large amount of Mn to the steel sheet.

In order to impart rust resistance to a steel sheet to extend material life, it is effective to galvanize the steel sheet in manufacturing a galvanized steel sheet.

However, in the case of manufacturing a galvanized steel sheet from a high-strength steel sheet containing a large amount of Mn as a base material, there is a problem in that the surface appearance of a coating deteriorates.

In usual, galvanizing treatment is performed after heat-treatment in a reducing atmosphere to produce a galvanized steel sheet. Since Mn, which is added to steel, is an easily oxidizable element, Mn in the steel is selectively oxidized even in a reducing atmosphere generally used and is concentrated on the surface of the steel sheet to form oxides thereon. The oxides reduce the wettability of the steel sheet surface with molten zinc to cause bare spots; hence, the increase in concentration of Mn in steel significantly reduces the wettability to frequently cause bare spots. Even in the case where no bare spot occurs, the oxides are present between the steel sheet and a coating and therefore deteriorate the adhesion of the coating.

For such problems, Patent Literature 1 discloses a method for improving wettability with molten zinc in such a manner that iron oxide is formed on a surface of a steel sheet by heating the steel sheet in an oxidizing atmosphere in advance, followed by reductive annealing. Patent Literature 2 discloses a method for suppressing the formation of oxides on a surface of a steel sheet in such a manner that, in a continuous galvanizing line, the dew point of an annealing atmosphere is reduced to reduce the oxygen potential of the atmosphere. Patent Literature 3 discloses a method in which after a base material is subjected to recrystallization-annealing in a continuous annealing line, oxides are removed from a surface of a steel sheet by pickling and the steel sheet is reductively annealed again and is then galvanized.

However, these methods require the significant modification of facilities or the addition of a heat treatment step because the addition of an oxidation step or a facility for reducing the oxygen potential is necessary to improve coating appearance or a re-annealing step for galvanizing is necessary, leading to the increase in cost of final products. Furthermore, these methods cannot cope with drastic increase in amount of Mn added.

CITATION LIST

Patent Literature

PTL 1: Japanese Unexamined Patent Application Publication No. 61-157625
PTL 2: Japanese Unexamined Patent Application Publication No. 2010-255110
PTL 3: Japanese Unexamined Patent Application Publication No. 7-70723

SUMMARY

Technical Problem

In view of the above circumstances, it is an object of the present disclosure to provide a method for manufacturing a high-strength galvanized steel sheet excellent in formability, surface appearance, and coating adhesion; a method for manufacturing a hot-rolled steel sheet for high-strength galvanized steel sheets; a method for manufacturing a cold-rolled steel sheet for high-strength galvanized steel sheets; and a high-strength galvanized steel sheet.

Solution to Problem

In order to manufacture a high-strength galvanized steel sheet, excellent in formability, surface appearance, and coating adhesion, containing Mn, the inventors have performed intensive investigations. As a result, the inventors have found the followings.

Mn is enriched in austenite in such a manner that steel containing 2.00% by mass to 10.00% by mass Mn is hot-rolled, is descaled by pickling, and is then held in a temperature range of 650° C. to 850° C. for 600 s (seconds) to 21,600 s. As a result, the concentration of Mn in retained austenite can be increased and the ductility can be increased.

After hot rolling and descaling by pickling, a heat treatment (hereinafter referred to as the first heat treatment) is performed in such a manner that a steel sheet is held in a temperature range of 650° C. to 850° C. for 600 s to 21,600 s in an atmosphere having an $H_2$ concentration of 0.1% by volume to 25.0% by volume and a dew point of −45° C. to 0° C. in such a state that a surface of the steel sheet is exposed to the atmosphere, whereby Mn oxides are formed on the steel sheet surface and a region with a low Mn concentration can be formed in a surface layer of the steel sheet. After the first heat treatment, the steel sheet is cold-rolled at a rolling reduction of 30% or more as required and is then pickled under such conditions that the pickling weight loss is 0.03 $g/m^2$ to 5.00 $g/m^2$ in terms of Fe, whereby the Mn oxides are removed from the steel sheet surface. As a result, the diffusion of solute Mn in the steel sheet to the steel sheet surface can be suppressed and the formation of the Mn oxides on the steel sheet surface can be suppressed.

After the above pickling, a heat treatment (hereinafter referred to as the second heat treatment) is performed in such a manner that the steel sheet is held in a temperature range of 600° C. to 830° C. for 20 s to 900 s in an atmosphere having an $H_2$ concentration of 0.05% by volume to 25.0% by volume and a dew point of −10° C. or lower, followed by cooling and then galvanizing, whereby the value obtained by dividing the average mass percentage of Mn in retained austenite by the average mass percentage of Mn in ferrite is controlled to 2.0 or more. As a result, retained austenite stabilized with Mn is ensured and therefore a high-strength galvanized steel sheet excellent in formability including ductility can be manufactured.

The present disclosure is based on the above findings and has features below.

[1] A high-strength galvanized steel sheet has a composition containing C: 0.030% to 0.250%, Si: 0.01% to 3.00%, Mn: 2.00% to 10.00%, P: 0.001% to 0.100%, S: 0.0001% to 0.0200%, N: 0.0005% to 0.0100%, and Ti: 0.005% to 0.200% on a mass basis, the remainder being Fe and inevitable impurities. The concentration of solute Mn at a depth of 5 m or less from a surface of the steel sheet is 1.50% by mass or less and the value obtained by dividing the average mass percentage of Mn in retained austenite by the average mass percentage of Mn in ferrite is 2.0 or more.

[2] In the high-strength galvanized steel sheet specified in Item [11], the composition further contains at least one element selected from Al: 0.01% to 2.00%, Nb: 0.005% to 0.200%, B: 0.0003% to 0.0050%, Ni: 0.005% to 1.000%, Cr: 0.005% to 1.000%, V: 0.005% to 0.500%, Mo: 0.005% to 1.000%, Cu: 0.005% to 1.000%, Sn: 0.002% to 0.200%, Sb: 0.005% to 0.100%, Ta: 0.001% to 0.010%, Ca: 0.0005% to 0.0050%, Mg: 0.0005% to 0.0050%, and a REM: 0.0005% to 0.0050% on a mass basis.

[3] A method for manufacturing a high-strength galvanized steel sheet includes hot-rolling a steel slab having a composition containing C: 0.030% to 0.250%, Si: 0.01% to 3.00%, Mn: 2.00% to 10.00%, P: 0.001% to 0.100%, S: 0.0001% to 0.0200%, N: 0.0005% to 0.0100%, and Ti: 0.005% to 0.200% on a mass basis, the remainder being Fe and inevitable impurities; performing pickling; performing a first heat treatment in such a manner that a steel sheet is held in a temperature range of 650° C. to 850° C. for 600 s to 21,600 s in an atmosphere having an $H_2$ concentration of 0.1% by volume to 25.0% by volume and a dew point of −45° C. to 0° C. in such a state that a surface of the steel sheet is exposed; performing cooling; performing pickling under such conditions that the pickling weight loss is 0.03 g/m² to 5.00 g/m² in terms of Fe; performing a second heat treatment in such a manner that the steel sheet is held in a temperature range of 600° C. to 830° C. for 20 s to 900 s in an atmosphere having an $H_2$ concentration of 0.05% by volume to 25.0% by volume and a dew point of −10° C. or lower; performing cooling; and then performing galvanizing.

[4] In the method for manufacturing the high-strength galvanized steel sheet specified in Item [3], cold rolling is performed at a rolling reduction of 30% or more after performing the first heat treatment and the cooling.

[5] The method for manufacturing the high-strength galvanized steel sheet specified in Item [3] or [4] further includes performing alloying on the steel sheet after performing the galvanizing.

[6] In the method for manufacturing the high-strength galvanized steel sheet specified in any one of Items [3] to [5], the composition further contains at least one element selected from Al: 0.01% to 2.00%, Nb: 0.005% to 0.200%, B: 0.0003% to 0.0050%, Ni: 0.005% to 1.000%, Cr: 0.005% to 1.000%, V: 0.005% to 0.500%, Mo: 0.005% to 1.000%, Cu: 0.005% to 1.000%, Sn: 0.002% to 0.200%, Sb: 0.005% to 0.100%, Ta: 0.001% to 0.010%, Ca: 0.0005% to 0.0050%, Mg: 0.0005% to 0.0050%, and a REM: 0.0005% to 0.0050% on a mass basis.

[7] A method for manufacturing a hot-rolled steel sheet for high-strength galvanized steel sheets includes hot-rolling a steel slab having a composition containing C: 0.030% to 0.250%, Si: 0.01% to 3.00%, Mn: 2.00% to 10.00%, P: 0.001% to 0.100%, S: 0.0001% to 0.0200%, N: 0.0005% to 0.0100%, and Ti: 0.005% to 0.200% on a mass basis, the remainder being Fe and inevitable impurities; performing pickling; and then performing a heat treatment in such a manner that a steel sheet is held in a temperature range of 650° C. to 850° C. for 600 s to 21,600 s in an atmosphere having an $H_2$ concentration of 0.1% by volume to 25.0% by volume and a dew point of −45° C. to 0° C. in such a state that a surface of the steel sheet is exposed.

[8] In the method for manufacturing the hot-rolled steel sheet for high-strength galvanized steel sheets specified in Item [7], the composition further contains at least one element selected from Al: 0.01% to 2.00%, Nb: 0.005% to 0.200%, B: 0.0003% to 0.0050%, Ni: 0.005% to 1.000%, Cr: 0.005% to 1.000%, V: 0.005% to 0.500%, Mo: 0.005% to 1.000%, Cu: 0.005% to 1.000%, Sn: 0.002% to 0.200%, Sb: 0.005% to 0.100%, Ta: 0.001% to 0.010%, Ca: 0.0005% to 0.0050%, Mg: 0.0005% to 0.0050%, and a REM: 0.0005% to 0.0050% on a mass basis.

[9] A method for manufacturing a cold-rolled steel sheet for high-strength galvanized steel sheets includes hot-rolling a steel sheet having a composition containing C: 0.030% to 0.250%, Si: 0.01% to 3.00%, Mn: 2.00% to 10.00%, P: 0.001% to 0.100%, S: 0.0001% to 0.0200%, N: 0.0005% to 0.0100%, and Ti: 0.005% to 0.200% on a mass basis, the remainder being Fe and inevitable impurities; performing pickling; performing a heat treatment in such a manner that the steel sheet is held in a temperature range of 650° C. to 850° C. for 600 s to 21,600 s in an atmosphere having an $H_2$ concentration of 0.1% by volume to 25.0% by volume and a dew point of −45° C. to 0° C. in such a state that a surface of the steel sheet is exposed; performing cooling; and then performing cold rolling at a rolling reduction of 30% or more.

[10] In the method for manufacturing the cold-rolled steel sheet for high-strength galvanized steel sheets specified in Item [9], the composition further contains at least one element selected from Al: 0.01% to 2.00%, Nb: 0.005% to 0.200%, B: 0.0003% to 0.0050%, Ni: 0.005% to 1.000%, Cr: 0.005% to 1.000%, V: 0.005% to 0.500%, Mo: 0.005% to 1.000%, Cu: 0.005% to 1.000%, Sn: 0.002% to 0.200%, Sb: 0.005% to 0.100%, Ta: 0.001% to 0.010%, Ca: 0.0005% to 0.0050%, Mg: 0.0005% to 0.0050%, and a REM: 0.0005% to 0.0050% on a mass basis.

In the present disclosure, the term "high-strength galvanized steel sheet" refers to a steel sheet with a tensile strength (TS) of 590 MPa or more and includes both a plated steel sheet (hereinafter referred to as GI in some cases) which is not alloyed after being galvanized and a plated steel sheet (hereinafter referred to as GA in some cases) which is alloyed after being galvanized.

Advantageous Effects

According to the present disclosure, a high-strength galvanized steel sheet which has a tensile strength of 590 MPa or more and which is excellent in formability, surface appearance, and coating adhesion is obtained. Improvements in fuel efficiency owing to weight reduction of an automobile body can be achieved by applying the high-strength galvanized steel sheet according to the present disclosure to, for example, automotive structural parts and the industrial usefulness thereof is very high.

DESCRIPTION OF EMBODIMENTS

Exemplary embodiments of the present disclosure are described below. The present disclosure is not limited to the embodiments below. The unit "%" used to express the content of each component refers to "mass percent".

First, a composition is described.

The composition contains C: 0.030% to 0.250%, Si: 0.01% to 3.00%, Mn: 2.00% to 10.00%, P: 0.001% to 0.100%, S: 0.0001% to 0.0200%, N: 0.0005% to 0.0100%, and Ti: 0.005% to 0.200%, the remainder being Fe and inevitable impurities. In addition to the above components, the composition may further contain at least one element selected from Al: 0.01% to 2.00%, Nb: 0.005% to 0.200%, B: 0.0003% to 0.0050%, Ni: 0.005% to 1.000%, Cr: 0.005% to 1.000%, V: 0.005% to 0.500%, Mo: 0.005% to 1.000%, Cu: 0.005% to 1.000%, Sn: 0.002% to 0.200%, Sb: 0.005% to 0.100%, Ta: 0.001% to 0.010%, Ca: 0.0005% to 0.0050%, Mg: 0.0005% to 0.0050%, and a REM: 0.0005% to 0.0050%. Each component is described below.

C: 0.030% to 0.250%

C is an element that is necessary to produce a low-temperature transformation phase such as martensite to increase the strength. C is also an element that is effective in enhancing the stability of retained austenite to enhance the ductility of steel. When the content of C is less than 0.030%, it is difficult to ensure the desired area fraction of martensite and therefore desired strength is not obtained. Furthermore, it is difficult to ensure the sufficient volume fraction of retained austenite and therefore good ductility is not obtained. However, when the content of C is excessive, more than 0.250%, the area fraction of martensite, which is hard, is too large; the number of micro-voids at martensite grain boundaries is large; the propagation of cracks proceeds; and the bendability and the stretch flange formability are deteriorated. Furthermore, the hardening of weld and heat-affected zones is significant, mechanical properties of the weld zones decrease, and therefore the spot weldability, the arc weldability and the like deteriorate. From the above, the content of C is 0.030% to 0.250%. The content of C is preferably 0.080% or more. The content of C is preferably 0.200% or less.

Si: 0.01% to 3.00%

Si enhances the work hardenability of ferrite and is, therefore, effective in ensuring good ductility. When the content of Si is less than 0.01%, the effect of containing Si is poor. Therefore, the lower limit thereof is 0.01%. However, excessively containing more than 3.00% Si causes the embrittlement of steel and also causes the deterioration of surface properties due to the occurrence of red scale or the like. Therefore, the upper limit thereof is 3.00. From the above, the content of Si is 0.01% to 3.00%. The content of Si is preferably 0.20% or more. The content of Si is preferably 2.00% or less.

Mn: 2.00% to 10.00%

Mn is an element extremely important in the present disclosure. Mn is an element stabilizing retained austenite and is effective in ensuring good ductility. Furthermore, Mn is an element increasing the strength of steel by solid solution strengthening. Such effects are exhibited when the content of Mn is 2.00% or more. However, excessively containing more than 10.00% Mn causes an increase in cost. When the content of Mn is more than 10.00%, the deterioration of coating appearance cannot be suppressed even by the present disclosure. From the above, the content of Mn is 2.00% to 10.00%. The content of Mn is preferably 3.00% or more. The content of Si is preferably 9.00% or less.

P: 0.001% to 0.100%

P is an element which has a solid solution strengthening effect and which may be contained depending on desired strength. P is also an element which accelerates the transformation of ferrite and which is, therefore, effective in obtaining a multi-phase microstructure. In order to obtain such effects, the content of P needs to be 0.001% or more. However, when the content of P is more than 0.100%, the deterioration of weldability is caused and, in the case of alloying a zinc coating, the rate of alloying is reduced, thereby impairing the quality of the zinc coating. From the above, the content of P is 0.001% to 0.100%. The content of P is preferably 0.005% or more. The content of P is preferably 0.050% or less.

S: 0.0001% to 0.0200%

S segregates at grain boundaries to embrittle steel during hot working and is present in the form of sulfides to reduce the local deformability. Therefore, the content of S needs to be 0.0200% or less, is preferably 0.0100% or less, and is more preferably 0.0050% or less. However, from restrictions on production techniques, the content of S needs to be 0.0001% or more. Thus, the content of S is 0.0001% to 0.0200%. The content of S is preferably 0.0001% to 0.0100% and more preferably 0.0001% to 0.0050%.

N: 0.0005% to 0.0100%

N is an element deteriorating the aging resistance of steel. In particular, when the content of N is more than 0.0100%, the deterioration of the aging resistance is significant. It is preferable that the content of N is small. However, excessive denitrogenizing causes an increase in manufacturing cost. From the above, the content of N is 0.0005% to 0.0100%. The content of N is preferably 0.0010% or more. The content of N is preferably 0.0070% or less.

Ti: 0.005% to 0.200%

Ti is effective on the precipitation hardening of steel; can reduce the difference in hardness between a hard second phase (martensite or retained austenite) and ferrite by forming the relatively hard ferrite; and can ensure good stretch flangeability. Such effects can be obtained when the content of Ti is 0.005% or more. However, when the content of Ti is more than 0.200%, the area fraction of martensite, which is hard, is too large; the number of micro-voids at martensite grain boundaries is large; the propagation of cracks proceeds; and the formability is deteriorated. From the above, the content of Ti is 0.005% to 0.200%. The content of Ti is preferably 0.010% or more. The content of Ti is preferably 0.100% or less.

The remainder are Fe and inevitable impurities.

Furthermore, in the present disclosure, a component below may be contained for a purpose below.

Containing at least one element selected from Al: 0.01% to 2.00%, Nb: 0.005% to 0.200%, B: 0.0003% to 0.0050%, Ni: 0.005% to 1.000%, Cr: 0.005% to 1.000%, V: 0.005% to 0.500%, Mo: 0.005% to 1.000%, Cu: 0.005% to 1.000%, Sn: 0.002% to 0.200%, Sb: 0.005% to 0.100%, Ta: 0.001% to 0.010%, Ca: 0.0005% to 0.0050%, Mg: 0.0005% to 0.0050%, and REM: 0.0005% to 0.0050%

Al is an element which expands a two-phase zone consisting of ferrite and austenite and which is effective in reducing the annealing temperature dependence, that is, which is effective on property stability. Al is also an element which acts as a deoxidizer and which is effective on the cleanliness of steel and is preferably contained in a deoxidizing step. When the content of Al is less than 0.01%, the effect of containing Al is poor. Therefore, the lower limit thereof is 0.01%. However, when the content of Al is more than 2.00%, the risk of causing slab cracking during continuous casting is high, leading to a reduction in productivity. From the above, when Al is contained, the content of Al is 0.01% to 2.00%. The content of Al is preferably 0.20% or more. The content of Al is preferably 1.20% or less.

Nb is effective on the precipitation hardening of steel. This effect is obtained when the content of Nb is 0.005% or more. Nb, as well as Ti, can reduce the difference in hardness from a hard second phase (martensite or retained austenite) by forming ferrite, which is relatively hard, and can ensure good stretch flangeability. This effect is obtained when the content of Nb is 0.005% or more. However, when the content of Nb is more than 0.200%, the area fraction of martensite, which is hard, is too large; the number of micro-voids at martensite grain boundaries is large; the propagation of cracks proceeds; and the formability is deteriorated. Furthermore, an increase in cost is caused. From the above, when Nb is contained, the content of Nb is 0.005% to 0.200%. The content of Nb is preferably 0.010% or more. The content of Nb is preferably 0.100% or less.

B has the effect of suppressing the formation and growth of ferrite from austenite grain boundaries, can flexibly control a microstructure, and therefore may be contained as required. This effect is obtained when the content of B is 0.0003% or more. However, when the content of B is more than 0.0050%, the formability is deteriorated. From the above, when B is contained, the content of B is 0.0003% to 0.0050%. The content of B is preferably 0.0005% or more. The content of B is preferably 0.0030% or less.

Ni is an element stabilizing retained austenite and is effective in ensuring good ductility. Furthermore, Ni is an element increasing the strength of steel by solid solution hardening. These effects are obtained when the content of Ni is 0.005% or more. However, when the content of Ni is more than 1.000%, martensite, which is hard, is too large; the number of micro-voids at martensite grain boundaries is large; the propagation of cracks proceeds; and the bendability and stretch flangeability are deteriorated. Furthermore, an increase in cost is caused. From the above, when Ni is contained, the content of Ni is 0.005% to 1.000%.

Cr, V, and Mo have the effect of enhancing the balance between strength and ductility and therefore may be contained as required. The effect thereof is obtained when the content of Cr, V, or Mo is 0.005% or more. When the content of Cr, V, or Mo is excessive, more than 1.000%, more than 0.500%, or 1.000%, respectively, martensite, which is hard, is too large; the number of micro-voids at martensite grain boundaries is large; the propagation of cracks proceeds; and the formability is deteriorated. Furthermore, an increase in cost is caused. From the above, when Cr, V, or Mo is contained, the content of Cr is 0.005% to 1.000%, the content of V is 0.005% to 0.500%, or the content of Mo is 0.005% to 1.000%.

Cu is an element effective in strengthening steel and may be used to strengthen steel within a range specified in present disclosure. Such an effect is obtained when the content of Cu is 0.005% or more. However, when the content of Cu is more than 1.000%, martensite, which is hard, is too large; the number of micro-voids at martensite grain boundaries is large; the propagation of cracks proceeds; and the formability is deteriorated. From the above, when Cu is contained, the content of Cu is 0.005% to 1.000%.

Sn and Sb may be contained as required from the viewpoint of suppressing the decarburization of a region of about several tens of micrometers in a surface layer of a steel sheet that is caused by the nitriding or oxidation of a surface of the steel sheet. Suppressing the nitriding or oxidation thereof prevents the reduction in area fraction of martensite in the steel sheet surface and is effective in ensuring strength and property stability. However, the excessive addition thereof causes a reduction in toughness. From the above, when Sn is contained, the content of Sn is 0.002% to 0.200%, and when Sb is contained, the content of Sb is 0.005% to 0.100%.

Ta, as well as Ti and Nb, forms alloy carbides and alloy carbonitrides to contribute to an increase in strength. In addition, Ta partially forms solid solutions with Nb carbides and Nb carbonitrides, significantly suppresses the coarsening of precipitates by producing complex precipitates such as (Nb, Ta) (C, N), and probably has the effect of stabilizing contribution to strength by solid solution hardening. Therefore, Ta is preferably contained. The effect of stabilizing these precipitates is obtained when the content of Ta is 0.001% or more. However, the excessive addition of Ta saturates the effect of stabilizing these precipitates and increases alloying costs. From the above, when Ta is contained, the content of Ta is 0.001% to 0.010%.

Ca, Mg, and the REM are elements which are respectively effective in spheroidizing the shape of sulfides to improve the negative influence of the sulfides on hole expansibility (stretch flangeability). In order to obtain this effect, the content thereof needs to be 0.0005% or more. However, when the content thereof is more than 0.0050%, the increase of inclusions or the like is caused and surface defects, internal defects, and the like are caused. From the above, when Ca, Mg, and the REM are contained, the content of each of Ca, Mg, and the REM is 0.0005% to 0.0050%.

A microstructure is described below.

In a high-strength galvanized steel sheet according to the present disclosure, the concentration of solute Mn at a depth of 5 μm or less from a surface of the steel sheet is 1.50% by mass or less and the value obtained by dividing the average mass percentage of Mn in retained austenite by the average mass percentage of Mn in ferrite is 2.0 or more.

Concentration of solute Mn at depth of 5 μm or less from steel sheet surface being 1.50% by mass or less When a region with a low solute Mn concentration is present directly under the steel sheet surface, the formation of Mn oxides on the steel sheet surface is suppressed in a second heat treatment step. As a result, a galvanized steel sheet excellent in surface appearance and coating adhesion can be obtained. However, when the concentration of Mn directly under the steel sheet surface is high, that is, when the concentration of solute Mn at a depth of 5 μm or less from the steel sheet surface is more than 1.50% by mass, the Mn oxides are formed on the steel sheet surface in the second heat treatment step and surface defects such as bare spots occur. Therefore, the concentration of solute Mn at a depth of 5 μm or less from the steel sheet surface is 1.50% by mass or less. Incidentally, the concentration of solute Mn at a depth of 5 μm or less from the steel sheet surface can be determined in such a manner that the distribution of Mn is determined using an EPMA (electron probe micro-analyzer) and results obtained by analyzing the amount of Mn in crystal grains at a depth of 5 μm or less from the steel sheet surface are averaged.

The concentration of solute Mn at a depth of 5 m or less from the steel sheet surface can be adjusted to 1.50% by mass or less by controlling first heat treatment and pickling conditions as described below.

Value obtained by dividing average mass percentage of Mn in retained austenite by average mass percentage of Mn in ferrite being 2.0 or more The value obtained by dividing the average mass percentage of Mn in retained austenite by the average mass percentage of Mn in ferrite to be 2.0 or more is a requirement that is extremely important in ensuring good ductility in the present disclosure. When the value obtained by dividing the average mass percentage of Mn in retained austenite by the average mass percentage of Mn in ferrite is less than 2.0, a retained austenite phase is unstable and no good effect on ductility is expected. Incidentally, the average mass percentage of Mn therein can be determined in such a manner that the distribution of Mn in each phase in a rolling direction cross section at a through-thickness one-fourth position is determined using an EPMA (electron probe micro-analyzer) and results obtained by analyzing the amount of Mn in 30 retained austenite grains and 30 ferrite grains are averaged.

The value obtained by dividing the average mass percentage of Mn in retained austenite by the average mass percentage of Mn in ferrite can be adjusted to 2.0 or more by appropriately controlling the first heat treatment conditions, the pickling conditions, and second heat treatment conditions as described below.

The microstructure of the present disclosure may contain carbides (excluding cementite in pearlite) such as pearlite and cementite within a range of 10% or less in terms of area fraction in addition to retained austenite, ferrite, and martensite. This does not impair effects of the present disclosure.

A method for manufacturing the high-strength galvanized steel sheet according to the present disclosure is described below.

The high-strength galvanized steel sheet according to the present disclosure is manufactured in such a manner that a steel slab having the above composition is hot-rolled, pickling is performed, a first heat treatment is performed in such a manner that the steel sheet is held in a temperature range of 650° C. to 850° C. for 600 s to 21,600 s in an atmosphere having an $H_2$ concentration of 0.1% by volume to 25.0% by volume and a dew point of −45° C. to 0° C. in such a state that a surface of the steel sheet is exposed, cooling is performed, pickling is performed under such conditions that the pickling weight loss is 0.03 $g/m^2$ to 5.00 $g/m^2$ in terms of Fe, a second heat treatment is performed in such a manner that the steel sheet is held in a temperature range of 600° C. to 830° C. for 20 s to 900 s in an atmosphere having an $H_2$ concentration of 0.05% by volume to 25.0% by volume and a dew point of −10° C. or lower, cooling is performed, and galvanizing is then performed. Furthermore, cold rolling may be performed at a rolling reduction of 30% or more as required after the first heat treatment and cooling are performed. The galvanized steel sheet may be further alloyed as required.

A hot-rolled steel sheet for high-strength galvanized steel sheets according to the present disclosure is manufactured in such a manner that the steel slab having the above composition is subjected to hot rolling to obtain a hot-rolled steel sheet, pickling is performed, and a heat treatment is performed in such a manner that the steel sheet is held in a temperature range of 650° C. to 850° C. for 600 s to 21,600 s in an atmosphere having an $H_2$ concentration of 0.1% by volume to 25.0% by volume and a dew point of −45° C. to 0° C. in such a state that a surface of the steel sheet is exposed.

A method for manufacturing the hot-rolled steel sheet itself is not particularly limited and may be a known method. The steel slab having the above composition is heated at a temperature of, for example, 1,100° C. to 1,400° C. and is then hot-rolled. In general, in a hot rolling step, descaling is performed by high-pressure water spraying between rough rolling and finish rolling and coiling is performed after finish rolling.

A cold-rolled steel sheet for high-strength galvanized steel sheets according to the present disclosure is manufactured in such a manner that the steel slab having the above composition is hot-rolled, pickling is performed, a heat treatment is performed in such a manner that the steel sheet is held in a temperature range of 650° C. to 850° C. for 600 s to 21,600 s in an atmosphere having an $H_2$ concentration of 0.1% by volume to 25.0% by volume and a dew point of −45° C. to 0° C. in such a state that a surface of the steel sheet is exposed, cooling is performed, and cold rolling is then performed at a rolling reduction of 30% or more.

Detailed descriptions are given below.

First heat treatment: holding steel sheet in temperature range of 650° C. to 850° C. for 600 s to 21,600 s in atmosphere having $H_2$ concentration of 0.1% by volume to 25.0% by volume and dew point of −45° C. to 0° C. in such state that steel sheet surface is exposed The first heat treatment is performed for the purpose of forming Mn oxides on the steel sheet surface to form a region with a low Mn concentration within 5 μm from the steel sheet surface and for the purpose of enriching Mn in austenite in a region 10 m or more apart from the steel sheet surface.

$H_2$ is necessary to suppress the oxidation of Fe on the steel sheet surface during the heat treatment. When the $H_2$ concentration is less than 0.1% by volume, Fe on the steel sheet surface is oxidized during the heat treatment and Fe oxides cannot be removed even by pickling below; hence, coating appearance deteriorates. However, an $H_2$ concentration of more than 25.0% by volume leads to an increase in cost. Thus, the $H_2$ concentration is 0.1% by volume to 25.0% by volume.

When the dew point is lower than −45° C., the formation of the Mn oxides on the steel sheet surface does not proceed. However, when the dew point is higher than 0° C., Fe is oxidized on the steel sheet surface to deteriorate coating appearance and adhesion. Thus, the dew point is −45° C. to 0° C.

In the case where the first heat treatment is performed in a temperature range of lower than 650° C. or for a holding time of less than 600 s, the enrichment of Mn in austenite does not proceed, it is difficult to sufficiently ensure the mass percentage of Mn in retained austenite after final annealing, and the ductility decreases. Furthermore, the formation of the Mn oxides on the steel sheet surface is suppressed and therefore a Mn-deficient region that is necessary to suppress the diffusion of solute Mn to the steel sheet surface cannot be formed in a second heat treatment step. In the case where the steel sheet is held in a temperature range of higher than 850° C., the enrichment of Mn in austenite does not proceed, it is difficult to sufficiently ensure the mass percentage of Mn in retained austenite after the second heat treatment, and the ductility decreases. In the case where the steel sheet is held for more than 21,600 s, the enrichment of Mn in austenite is saturated, an effect on the resultant ductility after the second heat treatment is small, and an increase in cost is caused. Furthermore, not only the Mn oxides but also oxides containing an Fe solid solution are formed on the steel sheet surface, remain after pickling, deteriorate plating wettability in a plating step, and deteriorate surface appearance.

In order to form the Mn oxides on the steel sheet surface, the steel sheet surface needs to be exposed to a heat treatment atmosphere, that is, such a state that the steel sheet surface is exposed is necessary. A method for exposing the steel sheet to the heat treatment atmosphere is not particularly limited. Examples of this method include a method using a continuous annealing furnace and, in the case of batch annealing of a steel sheet coil, a method using a so-called open coil, that is, annealing a coil in such a state that an atmosphere appropriately enters gaps between steel sheet surfaces by loosely winding a coil.

Cooling

Cooling is not particularly limited.

Cold rolling: rolling reduction of 30% or more After the first heat treatment and subsequent cooling are performed, cold rolling is performed as required. Owing to the rolling reduction of 30% or more, austenite is finely produced during the second heat treatment, and finally a fine retained austenite phase is obtained. Therefore the bendability is improved.

Performing cold rolling causes cracks in the Mn oxides formed on the steel sheet surface in the first heat treatment step. This enables the Mn oxides to be efficiently removed in a pickling step below. Therefore, the rolling reduction is 30% or more and is preferably 50% or more.

Pickling: pickling weight loss of 0.03 $g/m^2$ to 5.00 $g/m^2$ in terms of Fe

Pickling is performed for the purpose of cleaning the steel sheet surface and for the purpose of removing oxides (the Mn oxides) formed on the steel sheet surface in the first heat treatment.

When the pickling weight loss is less than 0.03 $g/m^2$ in terms of Fe, the oxides are not sufficiently removed in some cases. When the pickling weight loss is more than 5.00 $g/m^2$, not only the oxides on the steel sheet surface but also an inner portion of the steel sheet that has a reduced Mn concentration are dissolved in some cases; hence, the formation of the Mn oxides cannot be suppressed in the second heat treatment in some cases. Thus, the pickling weight loss is 0.03 $g/m^2$ to 5.00 $g/m^2$ in terms of Fe. The pickling weight loss in terms of Fe can be determined from the change in concentration of Fe in a pickling solution before and after processing and the area of a processed material.

Second heat treatment: holding steel sheet in temperature range of 600° C. to 830° C. for 20 s to 900 s in atmosphere having $H_2$ concentration of 0.05% by volume to 25.0% by volume and dew point of −10° C. or lower The second heat treatment is performed for the purpose of further accelerating the enrichment of Mn in austenite and for the purpose of activating the surface of the steel sheet before the steel sheet surface is galvanized.

$H_2$ is necessary to suppress the oxidation of Fe on the steel sheet surface during heat treatment. When the $H_2$ concentration is less than 0.05% by volume, Fe on the steel sheet surface is oxidized. When the $H_2$ concentration is more than 25.0% by volume, an increase in cost is caused. Thus, the $H_2$ concentration is 0.05% by volume to 25.0% by volume. When the dew point of the atmosphere is higher than −10° C., solute Mn in inner part of the steel sheet is likely to diffuse into a surface layer to form oxides on the steel sheet surface and the coating appearance deteriorates. Furthermore, in order to suppress the formation of the Mn oxides in a heat treatment at high temperature for a long time, the dew point is preferably −40° C. or lower. When the temperature is lower than 600° C. or the holding time is less than 20 s, the enrichment of Mn in austenite does not proceed, it is difficult to ensure the sufficient volume fraction of retained austenite, and the ductility decreases. However, when the temperature is higher than 830° C., not only the ductility decreases because the enrichment of Mn in austenite does not proceed but also the coating appearance deteriorates because Mn is likely to form oxides on the steel sheet surface. When the holding time is more than 900 s, solute Mn in inner part of the steel sheet is likely to diffuse into the surface layer to form oxides on the steel sheet surface and therefore the coating appearance deteriorates. Thus, the temperature is 600° C. to 830° C. and the holding time is 20 s to 900 s.

Cooling

The cooling rate is not particularly limited and is preferably 2.0° C./s or more.

Galvanizing

Galvanizing is performed in such a manner that the steel sheet is galvanized by dipping the steel sheet in a galvanizing bath.

In the case of manufacturing a galvanized steel sheet, a zinc plating bath having a temperature of 440° C. to 550° C. and an Al concentration of 0.14% by mass to 0.24% by mass is preferably used.

When the bath temperature is lower than 440° C., Zn may possibly be solidified in a low-temperature part because of the variation in temperature in the bath and therefore the coating appearance deteriorates in some cases. When the bath temperature is higher than 550° C., the evaporation from the bath is significant and vaporized zinc adheres to the inside of a furnace to cause an operational problem in some cases. In addition, alloying proceeds during plating and therefore over-alloying is likely to occur.

When the Al concentration in the bath is less than 0.14% by mass, the formation of an Fe—Zn alloy on the steel sheet surface proceeds in the bath to deteriorate the coating adhesion in some cases. When the Al concentration is more than 0.24% by mass, defects due to Al oxides formed on the surface of the bath are caused in some cases.

In the case of manufacturing a galvannealed steel sheet by performing alloying after plating, a zinc plating bath with an Al concentration of 0.10% to 0.20% is preferably used. When the Al concentration in the bath is less than 0.10% by mass, a large amount of a r phase may be produced and the coating adhesion (powdering property) deteriorates in some cases. When the Al concentration is more than 0.20%, Fe—Zn alloying does not proceed in some cases.

The concentration of Al in a zinc coating layer is preferably 0.1% to 3.0%.

The galvanizing bath contains a predetermined amount of Al for the purpose of inhibiting the alloying reaction of Zn with Fe in the bath and for the purpose of suppressing dross in the bath. This is because Al reacts more preferentially with Fe on the steel sheet surface than Zn to form an alloy phase in Fe—Al system and inhibits the alloying reaction of Fe with Zn. In an unalloyed galvanized steel sheet, the Fe—Al alloy phase is present in a coating layer in the form of an Fe—Al alloy. In an alloyed galvannealed steel sheet, the Fe—Al alloy is dispersedly present in a zinc coating layer. In order to obtain such an effect, the concentration of Al in the zinc coating layer is preferably 0.1% or more. However, when Al is excessively contained, many Al oxide films are formed on the surface of the galvanizing bath to cause coating surface defects. Therefore, the concentration of Al in the zinc coating layer is preferably 3.0% or less.

In the galvanizing bath, the alloying reaction of Zn with Fe is inhibited by the addition of Al as described above. However, Fe slightly dissolves in Zn to form a solid solution with Zn and therefore 0.01% or more Fe is contained in a coating layer. On the other hand, in the case of performing alloying, Fe—Zn alloy phases such as a ζ phase, a δ phase, and a Γ phase are formed in the coating layer by alloying. Excessive formation of the Γ phase, which is hard and brittle, reduces the coating adhesion. The reduction of the coating adhesion is significant when the concentration of Fe in the coating layer is more than 15.00%. Therefore, the concentration of Fe in the coating layer is preferably 0.01% to 15.00%.

Alloying

After the plating step, the steel sheet is further subjected to alloying as required. Alloying conditions are not particularly limited. The alloying temperature is preferably 450° C. to 580° C. When the alloying temperature is lower than 450° C., the progress of alloying is slow. When the alloying temperature is higher than 580° C., a large amount of a Zn—Fe alloy layer (F phase) which is hard and brittle is formed at an interface with a base metal by over-alloying and the coating adhesion (powdering property) deteriorates.

Examples

Steels having a composition shown in Table 1, the remainder being Fe and inevitable impurities, were produced using a converter and were cast into slabs by a continuous casting process. The obtained slabs were hot-rolled, were pickled, and were then subjected to a first heat treatment under conditions shown in Tables 2, 3, and 4, followed by cold rolling, pickling, and/or a second heat treatment as required. Subsequently, galvanizing was performed, followed by alloying as required, whereby galvanized steel sheets (GI) and galvannealed steel sheets (GA) were obtained.

The obtained steel sheets were examined for cross-sectional microstructure, tensile properties, and coating properties (surface appearance and coating adhesion).

<Cross-Sectional Microstructure>

The concentration of Mn at a depth of 5 μm or less from a surface of each steel sheet was determined in such a manner that the distribution of Mn was quantitatively determined using an EPMA (electron probe micro-analyzer) and results obtained by analyzing the amount of Mn in crystal grains at a depth of 5 μm or less from the steel sheet surface were averaged.

The average mass percentage of Mn in retained austenite and the average mass percentage of Mn in ferrite were determined in such a manner that the distribution of Mn in each phase in a rolling direction cross section at a through-thickness one-fourth position was quantitatively determined using an EPMA (electron probe micro-analyzer) and results obtained by analyzing the amount of Mn in 30 retained austenite grains and 30 ferrite grains were averaged.

<Tensile Properties>

A tensile test was carried out in accordance with JIS Z 2241 (2011) using a JIS No. 5 test specimen that was sampled such that the tensile direction thereof was perpendicular to the rolling direction of each steel sheet, whereby TS (tensile strength) and EL (elongation) were measured. For tensile properties, the following cases were judged to be good: the case where TS was 590 MPa class and the inequalities EL≥34% and TS×EL≥22,000 MPa·% held, the case where TS was 780 MPa class and the inequalities EL≥30% and TS×EL≥22,000 MPa·% held, the case where TS was 980 MPa class and the inequalities EL≥24% and TS×EL≥22,000 MPa·% held, and the case where TS was 1,180 MPa class and the inequalities EL≥21% and TS×EL≥22,000 MPa·% held.

<Surface Appearance>

Whether there were appearance defects such as bare spots and pinholes was visually checked. The case where there were no appearance defects was judged to be good (A). The case where there were slight appearance defects and appearance was substantially good was judged to be substantially good (B). The case where there were appearance defects was judged to be (C). Cases judged to be substantially good (B) or good (A) were acceptable.

<Coating Adhesion>

The coating adhesion of each galvanized steel sheet was evaluated by a ball impact test. A worked portion of a steel sheet subjected to the ball impact test was peeled off with a cellophane tape and whether a coating layer was peeled off was visually checked. The ball impact test was carried out under conditions including a ball mass of 1.8 kg and a drop height of 100 cm.

A: No coating layer was peeled off.

C: A coating layer was peeled off.

The coating adhesion of each galvannealed steel sheet was evaluated by testing the powdering resistance thereof. A cellophane tape having a width of 24 mm and a length of 40 mm was attached to the galvannealed steel sheet, the steel sheet was bent to 90 degrees towards the side of the attached tape and was bent back, and then the tape was peeled off. The coating peeling operation as such was carried out on three places in total: ¼, 2/4, and ¾ with respect to the width of the steel sheet. The amount of a coating, peeled from the steel sheet, attached to the tape was determined from the number of Zn counts by X-ray fluorescence. The number of the Zn counts was converted into an amount per unit length (1 m). In the light of standards below, those ranked 2 or lower were rated excellent (A), those ranked 3 were rated good (B), and those ranked 4 or higher were rated poor (C). Those ranked 3 or lower were rated acceptable.

Number of Zn counts by X-ray fluorescence: rank 0 to less than 2,000: 1 (excellent)

2,000 to less than 5,000: 2 (excellent)

5,000 to less than 8,000: 3 (good)

8,000 to less than 12,000: 4 (poor)

12,000 or more: 5 (poor)

Results obtained as described above are shown in Tables 2, 3, and 4 together with the conditions.

TABLE 1

| Steel symbol | C | Si | Mn | P | S | N | Ti | Al | Nb | B | Ni | Cr |
|---|---|---|---|---|---|---|---|---|---|---|---|---|
| | | | | | | | | | | | | (mass %) |
| A | 0.098 | 0.12 | 2.33 | 0.021 | 0.0010 | 0.0037 | 0.021 | — | — | — | — | — |
| B | 0.120 | 0.35 | 2.45 | 0.011 | 0.0018 | 0.0040 | 0.025 | — | — | — | — | — |
| C | 0.152 | 0.02 | 3.56 | 0.015 | 0.0020 | 0.0038 | 0.042 | — | — | — | — | — |
| D | 0.153 | 0.54 | 3.61 | 0.008 | 0.0015 | 0.0032 | 0.031 | — | — | — | — | — |
| E | 0.165 | 0.02 | 4.23 | 0.014 | 0.0023 | 0.0042 | 0.035 | — | — | — | — | — |
| F | 0.155 | 0.60 | 4.25 | 0.022 | 0.0015 | 0.0040 | 0.022 | — | — | — | — | — |
| G | 0.161 | 0.02 | 2.15 | 0.011 | 0.0007 | 0.0042 | 0.029 | — | — | — | — | — |
| H | 0.210 | 0.49 | 6.49 | 0.024 | 0.0022 | 0.0034 | 0.024 | — | — | — | — | — |

TABLE 1-continued

| | | | | | | | | | | | |
|---|---|---|---|---|---|---|---|---|---|---|---|
| I | 0.149 | 0.44 | 9.40 | 0.007 | 0.0029 | 0.0037 | 0.034 | — | — | — | — | — |
| J | 0.085 | 2.61 | 6.48 | 0.019 | 0.0022 | 0.0041 | 0.030 | — | — | — | — | — |
| K | 0.148 | 0.03 | 4.95 | 0.015 | 0.0028 | 0.0034 | 0.028 | — | — | — | — | — |
| L | 0.162 | 0.52 | 5.18 | 0.021 | 0.0023 | 0.0029 | 0.037 | — | — | — | — | — |
| M | 0.122 | 0.05 | 3.22 | 0.009 | 0.0008 | 0.0033 | 0.045 | 0.390 | — | — | — | — |
| N | 0.106 | 0.11 | 3.74 | 0.008 | 0.0022 | 0.0037 | 0.028 | — | 0.041 | — | — | — |
| O | 0.154 | 0.49 | 3.61 | 0.016 | 0.0009 | 0.0040 | 0.029 | — | — | 0.0015 | — | — |
| P | 0.124 | 0.03 | 4.56 | 0.025 | 0.0022 | 0.0032 | 0.038 | — | — | — | 0.291 | — |
| Q | 0.149 | 0.02 | 5.03 | 0.029 | 0.0018 | 0.0038 | 0.027 | — | — | — | — | 0.28 |
| R | 0.192 | 1.52 | 3.21 | 0.017 | 0.0008 | 0.0038 | 0.031 | — | — | — | — | — |
| S | 0.124 | 0.49 | 5.22 | 0.021 | 0.0025 | 0.0042 | 0.019 | — | — | — | — | — |
| T | 0.155 | 0.27 | 3.48 | 0.024 | 0.0019 | 0.0037 | 0.029 | — | — | — | — | — |
| U | 0.187 | 0.88 | 3.69 | 0.031 | 0.0011 | 0.0025 | 0.022 | — | — | — | — | — |
| V | 0.214 | 0.48 | 6.53 | 0.018 | 0.0022 | 0.0032 | 0.035 | — | — | — | — | — |
| W | 0.118 | 1.02 | 4.12 | 0.009 | 0.0021 | 0.0029 | 0.041 | — | — | — | — | — |
| X | 0.094 | 0.25 | 3.14 | 0.029 | 0.0009 | 0.0040 | 0.032 | — | — | — | — | — |
| Y | 0.133 | 0.57 | 5.44 | 0.021 | 0.0024 | 0.0028 | 0.018 | — | — | — | — | — |
| Z | 0.155 | 0.02 | 3.62 | 0.011 | 0.0031 | 0.0042 | 0.029 | — | — | — | — | — |
| AA | 0.098 | 4.50 | 5.23 | 0.025 | 0.0033 | 0.0033 | 0.027 | — | — | — | — | — |
| AB | 0.148 | 0.15 | 15.00 | 0.007 | 0.0008 | 0.0034 | 0.043 | — | — | — | — | — |

(mass %)

| Steel symbol | V | Mo | Cu | Sn | Ta | Ca | Mg | Sb | REM | Remarks |
|---|---|---|---|---|---|---|---|---|---|---|
| A | — | — | — | — | — | — | — | — | — | Inventive steel |
| B | — | — | — | — | — | — | — | — | — | Inventive steel |
| C | — | — | — | — | — | — | — | — | — | Inventive steel |
| D | — | — | — | — | — | — | — | — | — | Inventive steel |
| E | — | — | — | — | — | — | — | — | — | Inventive steel |
| F | — | — | — | — | — | — | — | — | — | Inventive steel |
| G | — | — | — | — | — | — | — | — | — | Inventive steel |
| H | — | — | — | — | — | — | — | — | — | Inventive steel |
| I | — | — | — | — | — | — | — | — | — | Inventive steel |
| J | — | — | — | — | — | — | — | — | — | Inventive steel |
| K | — | — | — | — | — | — | — | — | — | Inventive steel |
| L | — | — | — | — | — | — | — | — | — | Inventive steel |
| M | — | — | — | — | — | — | — | — | — | Inventive steel |
| N | — | — | — | — | — | — | — | — | — | Inventive steel |
| O | — | — | — | — | — | — | — | — | — | Inventive steel |
| P | — | — | — | — | — | — | — | — | — | Inventive steel |
| Q | — | — | — | — | — | — | — | — | — | Inventive steel |
| R | 0.19 | — | — | — | — | — | — | — | — | Inventive steel |
| S | — | 0.11 | — | — | — | — | — | — | — | Inventive steel |
| T | — | — | 0.007 | — | — | — | — | — | — | Inventive steel |
| U | — | — | — | 0.005 | — | — | — | — | — | Inventive steel |
| V | — | — | — | — | 0.004 | — | — | — | — | Inventive steel |
| W | — | — | — | — | — | 0.002 | — | — | — | Inventive steel |
| X | — | — | — | — | — | — | 0.002 | — | — | Inventive steel |
| Y | — | — | — | — | — | — | — | 0.008 | — | Inventive steel |
| Z | — | — | — | — | — | — | — | — | 0.002 | Inventive steel |
| AA | — | — | — | — | — | — | — | — | — | Comparative steel |
| AB | — | — | — | — | — | — | — | — | — | Comparative steel |

TABLE 2

| No | Steel | First heat treatment step | | | | Cold rolling step | Pickling step | Second heat treatment step | | | | Plating step | Alloying step |
|---|---|---|---|---|---|---|---|---|---|---|---|---|---|
| | | $H_2$ (%) | Dew point (° C.) | Heating temperature (° C.) | Holding time (s) | Rolling reduction (%) | Weight loss (g/m$^2$) | $H_2$ (%) | Dew point (° C.) | Heating temperature (° C.) | Holding time (s) | Al concentration (%) | Alloying temperature (° C.) |
| 1 | A | 5 | −30 | 680 | 18000 | 50 | 0.12 | 5.0 | −35 | 710 | 50 | 0.137 | 500 |
| 2 | A | 5 | −30 | 680 | 15000 | 50 | 0.12 | 5.0 | −35 | 710 | 50 | 0.195 | — |
| 3 | A | 5 | −30 | 750 | 10000 | 65 | 0.22 | 5.0 | −45 | 750 | 100 | 0.138 | 500 |
| 4 | A | 5 | −10 | 700 | 5000 | 50 | 0.18 | 10.0 | −30 | 750 | 100 | 0.124 | 510 |
| 5 | A | 5 | −35 | 700 | 10000 | 50 | 0.17 | 5.0 | −35 | 800 | 100 | 0.130 | 500 |
| 6 | B | 5 | −30 | 720 | 10000 | 80 | 0.08 | 5.0 | −35 | 730 | 100 | 0.204 | — |
| 7 | B | 5 | −35 | 800 | 15000 | — | 0.21 | 15.0 | −40 | 800 | 50 | 0.128 | 480 |
| 8 | B | 5 | −40 | 760 | 15000 | 50 | 0.15 | 15.0 | −30 | 710 | 150 | 0.142 | 480 |
| 9 | B | 5 | −20 | 700 | 12000 | 50 | 0.14 | 10.0 | −35 | 720 | 50 | 0.138 | 500 |
| 10 | B | 5 | −20 | 700 | 18000 | 50 | 0.22 | 10.0 | −30 | 720 | 50 | 0.124 | 500 |
| 11 | C | 5 | −30 | 680 | 18000 | 50 | 0.12 | 5.0 | −35 | 750 | 50 | 0.137 | 500 |
| 12 | C | 5 | −30 | 680 | 15000 | 50 | 0.45 | 5.0 | −40 | 700 | 120 | 0.195 | — |

TABLE 2-continued

| 13 | C | 5  | −30 | 830 | 18000 | 50 | 0.16 | 5.0  | −35 | 700 | 50  | 0.137 | 500 |
|----|---|----|-----|-----|-------|----|------|------|-----|-----|-----|-------|-----|
| 14 | C | 5  | −30 | 660 | 18000 | 50 | 0.11 | 5.0  | −35 | 700 | 50  | 0.138 | 500 |
| 15 | C | 10 | −30 | 680 | 21000 | 50 | 0.09 | 10.0 | −35 | 750 | 50  | 0.137 | 480 |
| 16 | C | 5  | −30 | 700 | 800   | 50 | 0.23 | 5.0  | −35 | 750 | 50  | 0.137 | 500 |
| 17 | C | 5  | −20 | 680 | 18000 | —  | 0.14 | 5.0  | −35 | 730 | 120 | 0.134 | 450 |
| 18 | C | 5  | −30 | 680 | 18000 | 35 | 0.10 | 15.0 | −35 | 710 | 50  | 0137  | 500 |
| 19 | C | 15 | −30 | 750 | 18000 | 75 | 0.12 | 5.0  | −50 | 750 | 50  | 0.134 | 500 |
| 20 | C | 5  | −30 | 680 | 18000 | 50 | 4.30 | 5.0  | −35 | 750 | 50  | 0.137 | 500 |
| 21 | C | 5  | −30 | 680 | 18000 | 50 | 0.04 | 5.0  | −35 | 750 | 50  | 0.137 | 500 |
| 22 | C | 5  | 0   | 680 | 18000 | 50 | 0.12 | 15.0 | −35 | 750 | 50  | 0.137 | 510 |
| 23 | C | 5  | −45 | 680 | 18000 | 50 | 0.12 | 5.0  | −35 | 750 | 50  | 0.137 | 500 |
| 24 | C | 5  | −30 | 680 | 15000 | 50 | 0.09 | 5.0  | −20 | 750 | 50  | 0.137 | 500 |
| 25 | C | 5  | −30 | 690 | 18000 | 50 | 0.18 | 10.0 | −50 | 750 | 500 | 0.137 | 500 |
| 26 | C | 5  | −30 | 680 | 18000 | 50 | 0.12 | 10.0 | −45 | 790 | 50  | 0.137 | 500 |
| 27 | C | 5  | −40 | 680 | 18000 | 40 | 0.12 | 10.0 | −35 | 630 | 50  | 0.137 | 500 |
| 28 | C | 5  | −30 | 720 | 8000  | 50 | 0.08 | 10.0 | −35 | 750 | 800 | 0.137 | 500 |
| 29 | C | 5  | −30 | 680 | 18000 | 50 | 0.12 | 10.0 | −35 | 680 | 30  | 0.137 | 500 |
| 30 | D | 5  | −30 | 720 | 18000 | 50 | 0.19 | 10.0 | −35 | 750 | 50  | 0.137 | 520 |
| 31 | D | 5  | −25 | 680 | 15000 | 50 | 0.11 | 10.0 | −35 | 750 | 50  | 0.195 | —   |
| 32 | D | 1  | −30 | 680 | 18000 | 50 | 0.12 | 5.0  | −35 | 760 | 50  | 0.137 | 520 |
| 33 | D | 15 | −30 | 680 | 15000 | 50 | 0.12 | 5.0  | −35 | 750 | 50  | 0.195 | —   |
| 34 | D | 5  | −30 | 800 | 10000 | 60 | 0.18 | 5.0  | −30 | 710 | 100 | 0.134 | 500 |
| 35 | D | 5  | −25 | 670 | 12000 | 50 | 0.08 | 10.0 | −30 | 710 | 100 | 0.136 | 510 |
| 36 | D | 5  | −40 | 780 | 15000 | 50 | 0.21 | 10.0 | −50 | 700 | 750 | 0.143 | 520 |
| 37 | D | 5  | −20 | 750 | 15000 | —  | 0.24 | 10.0 | −35 | 680 | 200 | 0.132 | 530 |
| 38 | D | 10 | −20 | 750 | 10000 | 50 | 0.09 | 15.0 | −35 | 700 | 60  | 0.132 | 530 |
| 39 | D | 5  | −25 | 670 | 1200  | 60 | 0.05 | 10.0 | −40 | 720 | 100 | 0.137 | 510 |
| 40 | D | 5  | −30 | 700 | 5000  | 50 | 0.11 | 15.0 | −40 | 700 | 100 | 0138  | 520 |
| 41 | D | 5  | −30 | 720 | 15000 | 50 | 0.12 | 5.0  | −35 | 700 | 300 | 0133  | 520 |
| 42 | D | 5  | −20 | 700 | 15000 | 40 | 0.20 | 10.0 | −35 | 730 | 500 | 0.197 | —   |

| No | Within 5 μm Solute Mn concentration (%) | Average Mn mass In retained austenite (%) | In ferrite (%) | Retained austenite/ ferrite | Properties TS (MPa) | EL (%) | TS × EL | Coating Surface appearance | Adhesion | Product | Remarks |
|----|------|------|------|-----|------|------|-------|---|---|----|------------------|
| 1  | 1.15 | 4.32 | 1.88 | 2.3 | 628  | 38.1 | 24000 | A | A | GA | Inventive example |
| 2  | 1.22 | 4.48 | 1.85 | 2.4 | 635  | 38.4 | 24400 | A | A | GI | Inventive example |
| 3  | 0.69 | 5.02 | 2.22 | 2.3 | 604  | 39.2 | 23700 | A | A | GA | Inventive example |
| 4  | 0.87 | 4.76 | 2.07 | 2.3 | 612  | 40.3 | 24700 | A | A | GA | Inventive example |
| 5  | 1.13 | 4.95 | 2.25 | 2.2 | 611  | 38.9 | 23800 | B | A | GA | Inventive example |
| 6  | 1.21 | 3.68 | 1.54 | 2.4 | 812  | 35.4 | 28800 | A | A | GI | Inventive example |
| 7  | 1.05 | 4.53 | 2.08 | 2.2 | 825  | 35.2 | 29100 | A | A | GA | Inventive example |
| 8  | 1.11 | 3.84 | 1.53 | 2.5 | 819  | 31.8 | 26100 | A | A | GA | Inventive example |
| 9  | 0.94 | 3.79 | 1.62 | 2.3 | 834  | 32.4 | 27100 | A | A | GA | Inventive example |
| 10 | 0.92 | 3.72 | 1.61 | 2.3 | 796  | 35.6 | 28400 | A | A | GA | Inventive example |
| 11 | 0.89 | 7.02 | 3.18 | 2.2 | 1018 | 25.4 | 25900 | A | A | GA | Inventive example |
| 12 | 0.84 | 7.29 | 3.05 | 2.4 | 1130 | 23.4 | 26500 | A | A | GI | Inventive example |
| 13 | 0.44 | 6.89 | 3.11 | 2.2 | 1116 | 21.3 | 23800 | A | A | GA | Inventive example |
| 14 | 1.33 | 7.62 | 3.28 | 2.3 | 1022 | 23.4 | 24000 | A | A | GA | Inventive example |
| 15 | 0.38 | 7.26 | 3.15 | 2.3 | 1108 | 22.7 | 25200 | A | A | GA | Inventive example |
| 16 | 1.22 | 5.99 | 2.53 | 2.4 | 995  | 24.6 | 24500 | A | A | GA | Inventive example |
| 17 | 0.34 | 7.54 | 3.22 | 2.3 | 1035 | 21.5 | 22300 | A | A | GA | Inventive example |
| 18 | 0.55 | 7.22 | 2.95 | 2.4 | 1104 | 23.2 | 25700 | A | A | GA | Inventive example |
| 19 | 1.18 | 7.46 | 3.08 | 2.4 | 1095 | 22.8 | 25000 | A | A | GA | Inventive example |
| 20 | 1.31 | 7.28 | 3.11 | 2.3 | 1057 | 22.4 | 23700 | A | A | GA | Inventive example |
| 21 | 0.87 | 7.22 | 2.95 | 2.4 | 1101 | 21.8 | 24100 | A | A | GA | Inventive example |
| 22 | 0.24 | 7.34 | 3.04 | 2.4 | 1027 | 21.9 | 22500 | A | A | GA | Inventive example |
| 23 | 1.38 | 7.41 | 3.16 | 2.3 | 1035 | 23.4 | 24300 | A | A | GA | Inventive example |
| 24 | 1.35 | 7.38 | 3.06 | 2.4 | 997  | 25.1 | 25100 | B | A | GA | Inventive example |
| 25 | 0.48 | 7.29 | 3.14 | 2.3 | 1004 | 24.7 | 24800 | A | A | GA | Inventive example |
| 26 | 1.10 | 7.54 | 3.45 | 2.2 | 1029 | 24.5 | 25300 | A | A | GA | Inventive example |
| 27 | 0.91 | 7.29 | 3.22 | 2.3 | 1104 | 25.3 | 28000 | A | A | GA | Inventive example |
| 28 | 1.24 | 7.62 | 3.51 | 2.2 | 1023 | 24.4 | 25000 | B | A | GA | Inventive example |
| 29 | 0.86 | 7.54 | 3.15 | 2.4 | 1019 | 23.8 | 24300 | A | A | GA | Inventive example |
| 30 | 0.79 | 6.92 | 2.88 | 2.4 | 1008 | 29.5 | 29800 | A | A | GA | Inventive example |
| 31 | 0.72 | 6.89 | 2.75 | 2.5 | 1015 | 30.2 | 30700 | A | A | GI | Inventive example |
| 32 | 1.18 | 7.22 | 3.18 | 2.3 | 1046 | 30.7 | 32200 | A | A | GA | Inventive example |
| 33 | 0.92 | 7.42 | 3.08 | 2.4 | 1102 | 28.3 | 31200 | A | A | GI | Inventive example |
| 34 | 0.31 | 7.18 | 3.24 | 2.2 | 1032 | 26.7 | 27600 | A | A | GA | Inventive example |
| 35 | 1.17 | 6.55 | 2.84 | 2.3 | 1067 | 27.6 | 29500 | A | A | GA | Inventive example |
| 36 | 0.95 | 7.31 | 2.94 | 2.5 | 1071 | 28.5 | 30600 | A | A | GA | Inventive example |
| 37 | 0.28 | 7.21 | 2.84 | 2.5 | 1055 | 28.6 | 30200 | A | A | GA | Inventive example |
| 38 | 0.33 | 7.28 | 2.88 | 2.5 | 1105 | 27.9 | 30900 | A | A | GA | Inventive example |
| 39 | 1.04 | 6.15 | 2.64 | 2.3 | 1089 | 28.1 | 30700 | A | A | GA | Inventive example |
| 40 | 0.85 | 7.43 | 3.05 | 2.4 | 1112 | 27.5 | 30600 | A | A | GA | Inventive example |

TABLE 2-continued

| | | | | | | | | | | | |
|---|---|---|---|---|---|---|---|---|---|---|---|
| 41 | 0.67 | 7.22 | 3.12 | 2.3 | 1108 | 27.3 | 30300 | A | A | GA | Inventive example |
| 42 | 1.14 | 6.77 | 2.93 | 2.3 | 1094 | 26.8 | 29400 | A | A | GI | Inventive example |

TABLE 3

| No | Steel | First heat treatment step | | | Cold rolling step | Pickling step | Second heat treatment step | | | | Plating step | Alloying step |
|---|---|---|---|---|---|---|---|---|---|---|---|---|
| | | H$_2$ (%) | Dew point (° C.) | Heating temperature (° C.) | Holding time (s) | Rolling reduction (%) | Weight loss (g/m$^2$) | H$_2$ (%) | Dew point (° C.) | Heating temperature (° C.) | Holding time (s) | Al concentration (%) | Alloying temperature (° C.) |
| 43 | D | 5 | −20 | 710 | 15000 | 50 | 0.08 | 10.0 | −40 | 730 | 500 | 0.146 | 530 |
| 44 | E | 5 | −30 | 680 | 18000 | 50 | 0.21 | 5.0 | −35 | 750 | 50 | 0.137 | 500 |
| 45 | E | 5 | −30 | 680 | 15000 | — | 0.12 | 5.0 | −35 | 750 | 150 | 0.195 | — |
| 46 | E | 5 | −20 | 680 | 10000 | 50 | 0.28 | 10.0 | −50 | 730 | 50 | 0.139 | 490 |
| 47 | E | 5 | −10 | 690 | 1000 | 50 | 0.31 | 5.0 | −40 | 700 | 50 | 0.139 | 510 |
| 48 | E | 5 | −20 | 730 | 10000 | 50 | 0.08 | 5.0 | −45 | 730 | 100 | 0.141 | 510 |
| 49 | F | 5 | −30 | 800 | 15000 | 65 | 0.35 | 5.0 | −40 | 680 | 100 | 0.193 | — |
| 50 | F | 5 | −20 | 690 | 15000 | 60 | 0.16 | 15.0 | −35 | 680 | 100 | 0.130 | 490 |
| 51 | F | 5 | −20 | 720 | 5000 | 50 | 0.11 | 15.0 | −45 | 680 | 100 | 0.137 | 500 |
| 52 | F | 5 | −20 | 720 | 5000 | 50 | 0.09 | 15.0 | −35 | 720 | 100 | 0.132 | 480 |
| 53 | G | 5 | −35 | 740 | 10000 | 50 | 0.09 | 10.0 | −35 | 720 | 100 | 0.138 | 490 |
| 54 | G | 5 | −30 | 680 | 10000 | 50 | 0.16 | 20.0 | −35 | 680 | 50 | 0.137 | 490 |
| 55 | G | 5 | −10 | 680 | 16000 | 50 | 0.15 | 10.0 | −45 | 670 | 50 | 0.142 | 500 |
| 56 | G | 5 | −25 | 700 | 12000 | — | 0.33 | 10.0 | −45 | 760 | 150 | 0.192 | — |
| 57 | G | 5 | −25 | 700 | 1500 | 50 | 0.55 | 15.0 | −35 | 750 | 120 | 0.138 | 480 |
| 58 | G | 5 | −35 | 670 | 20000 | 50 | 0.52 | 10.0 | −35 | 710 | 120 | 0.137 | 480 |
| 59 | H | 5 | −30 | 700 | 10000 | 50 | 1.05 | 10.0 | −35 | 680 | 50 | 0.139 | 490 |
| 60 | H | 5 | −30 | 680 | 15000 | 40 | 2.30 | 10.0 | −55 | 770 | 200 | 0.135 | 490 |
| 61 | H | 5 | −15 | 680 | 15000 | 50 | 1.16 | 15.0 | −45 | 680 | 100 | 0.137 | 500 |
| 62 | H | 5 | −40 | 710 | 15000 | 50 | 0.31 | 10.0 | −35 | 740 | 100 | 0.221 | — |
| 63 | H | 5 | −30 | 700 | 18000 | 50 | 0.08 | 10.0 | −30 | 740 | 50 | 0.137 | 500 |
| 64 | I | 5 | −20 | 750 | 10000 | 60 | 0.14 | 15.0 | −45 | 650 | 50 | 0.132 | 510 |
| 65 | I | 10 | −20 | 680 | 18000 | 50 | 0.11 | 10.0 | −50 | 720 | 60 | 0.137 | 520 |
| 66 | J | 5 | −30 | 800 | 15000 | 50 | 0.18 | 5.0 | −50 | 720 | 100 | 0.126 | 490 |
| 67 | J | 5 | −15 | 800 | 18000 | 50 | 0.11 | 5.0 | −35 | 680 | 60 | 0.205 | — |
| 68 | K | 10 | −30 | 680 | 20000 | 50 | 0.22 | 10.0 | −50 | 720 | 100 | 0.189 | — |
| 69 | K | 5 | −30 | 720 | 20000 | 65 | 0.14 | 10.0 | −40 | 750 | 50 | 0.128 | 500 |
| 70 | L | 5 | −30 | 680 | 18000 | 50 | 0.08 | 5.0 | −40 | 750 | 50 | 0.137 | 500 |
| 71 | M | 10 | −30 | 680 | 15000 | 50 | 0.05 | 10.0 | −35 | 710 | 50 | 0.137 | 500 |
| 72 | N | 5 | −40 | 760 | 18000 | 50 | 0.13 | 10.0 | −35 | 750 | 50 | 0.198 | — |
| 73 | O | 5 | −10 | 680 | 18000 | 40 | 0.21 | 5.0 | −35 | 660 | 50 | 0.137 | 500 |
| 74 | P | 5 | −30 | 680 | 10000 | 50 | 0.27 | 5.0 | −50 | 790 | 50 | 0.130 | 510 |
| 75 | Q | 5 | −10 | 680 | 18000 | 50 | 0.11 | 5.0 | −35 | 750 | 50 | 0.137 | 500 |
| 76 | R | 5 | −30 | 680 | 18000 | 45 | 0.16 | 5.0 | −35 | 750 | 50 | 0.210 | — |
| 77 | S | 5 | −30 | 680 | 3600 | 50 | 0.09 | 10.0 | −35 | 750 | 50 | 0.192 | — |
| 78 | T | 5 | −30 | 720 | 18000 | 50 | 0.12 | 15.0 | −45 | 760 | 50 | 0.137 | 500 |
| 79 | U | 5 | −30 | 680 | 18000 | 50 | 0.10 | 15.0 | −35 | 750 | 50 | 0.128 | 500 |
| 80 | V | 15 | −30 | 680 | 18000 | — | 0.08 | 5.0 | −50 | 760 | 50 | 0.137 | 470 |
| 81 | W | 5 | −30 | 680 | 18000 | 50 | 0.22 | 10.0 | −35 | 790 | 50 | 0.192 | — |
| 82 | X | 5 | −30 | 700 | 1000 | 50 | 0.34 | 10.0 | −35 | 750 | 50 | 0.138 | 500 |
| 83 | Y | 5 | −30 | 680 | 18000 | 50 | 0.18 | 10.0 | −35 | 750 | 50 | 0.135 | 520 |
| 84 | Z | 5 | −30 | 680 | 20000 | 50 | 0.14 | 10.0 | −35 | 650 | 50 | 0.137 | 500 |

| No | Within 5 μm Solute Mn concentration (%) | Average Mn mass | | Retained austenite/ ferrite | Properties | | | Coating | | Product | Remarks |
|---|---|---|---|---|---|---|---|---|---|---|---|
| | | In retained austenite (%) | In ferrite (%) | | TS (MPa) | EL (%) | TS × EL | Surface appearance | Adhesion | | |
| 43 | 0.88 | 8.11 | 3.59 | 2.3 | 1102 | 27.1 | 29900 | A | A | GA | Inventive example |
| 44 | 0.92 | 8.42 | 3.22 | 2.6 | 1224 | 25.4 | 31100 | A | A | GA | Inventive example |
| 45 | 0.53 | 8.29 | 3.12 | 2.7 | 1217 | 25.1 | 30600 | A | A | GI | Inventive example |
| 46 | 1.04 | 8.33 | 3.21 | 2.6 | 1236 | 24.9 | 30800 | A | A | GA | Inventive example |
| 47 | 0.42 | 8.29 | 3.14 | 2.6 | 1198 | 25.4 | 30500 | A | A | GA | Inventive example |
| 48 | 0.77 | 8.51 | 3.07 | 2.8 | 1208 | 26.9 | 32500 | A | A | GA | Inventive example |
| 49 | 0.81 | 7.98 | 3.06 | 2.6 | 1195 | 26.1 | 31200 | A | A | GI | Inventive example |
| 50 | 1.14 | 8.44 | 3.12 | 2.7 | 1254 | 25.5 | 32000 | A | A | GA | Inventive example |
| 51 | 1.08 | 8.54 | 3.05 | 2.8 | 1227 | 26.1 | 32100 | A | A | GA | Inventive example |
| 52 | 0.96 | 8.36 | 3.24 | 2.6 | 1233 | 25.4 | 31400 | A | A | GA | Inventive example |
| 53 | 0.29 | 8.67 | 3.18 | 2.7 | 608 | 41.5 | 25300 | A | A | GA | Inventive example |
| 54 | 0.33 | 7.66 | 3.11 | 2.5 | 611 | 41.2 | 25200 | A | A | GA | Inventive example |
| 55 | 0.24 | 7.25 | 3.21 | 2.3 | 618 | 40.8 | 25300 | A | A | GA | Inventive example |
| 56 | 0.54 | 7.51 | 3.33 | 2.3 | 603 | 42.1 | 25400 | A | A | GI | Inventive example |
| 57 | 0.94 | 6.37 | 2.94 | 2.2 | 625 | 40.5 | 25400 | A | A | GA | Inventive example |

TABLE 3-continued

| | | | | | | | | | | | |
|---|---|---|---|---|---|---|---|---|---|---|---|
| 58 | 0.66 | 6.92 | 3.15 | 2.2 | 623 | 41.2 | 25700 | A | A | GA | Inventive example |
| 59 | 1.24 | 9.67 | 4.11 | 2.4 | 1052 | 32.1 | 33800 | A | A | GA | inventive example |
| 60 | 1.12 | 9.42 | 3.88 | 2.4 | 1029 | 29.9 | 30800 | A | A | GA | Inventive example |
| 61 | 0.86 | 9.38 | 3.81 | 2.5 | 1102 | 28.6 | 31600 | A | A | GA | Inventive example |
| 62 | 0.88 | 9.51 | 4.12 | 2.3 | 1109 | 25.4 | 28200 | A | A | GI | Inventive example |
| 63 | 0.92 | 9.33 | 3.49 | 2.7 | 1066 | 24.9 | 26600 | A | A | GA | Inventive example |
| 64 | 1.22 | 17.24 | 6.22 | 2.8 | 1364 | 18.9 | 25800 | A | A | GA | Inventive example |
| 65 | 1.43 | 16.14 | 5.11 | 3.2 | 1453 | 19.4 | 28200 | A | A | GA | Inventive example |
| 66 | 1.08 | 9.54 | 3.53 | 2.7 | 1012 | 29.8 | 30200 | A | A | GA | Inventive example |
| 67 | 0.96 | 9.27 | 4.11 | 2.3 | 1030 | 31.2 | 32200 | A | A | GI | Inventive example |
| 68 | 0.98 | 10.02 | 4.56 | 2.2 | 1104 | 28.7 | 31700 | A | A | GI | Inventive example |
| 69 | 1.12 | 9.58 | 4.37 | 2.2 | 997 | 32.2 | 32200 | A | A | GA | Inventive example |
| 70 | 0.94 | 9.69 | 4.51 | 2.1 | 1003 | 31.1 | 31200 | A | A | GA | Inventive example |
| 71 | 1.22 | 5.24 | 2.27 | 2.3 | 1101 | 28.6 | 31500 | A | A | GA | Inventive example |
| 72 | 1.31 | 6.18 | 2.59 | 2.4 | 992 | 32.3 | 32100 | A | A | GI | Inventive example |
| 73 | 1.37 | 5.16 | 2.31 | 2.2 | 1055 | 24.1 | 25500 | A | A | GA | Inventive example |
| 74 | 0.59 | 7.83 | 3.44 | 2.3 | 1216 | 23.9 | 29100 | A | A | GA | Inventive example |
| 75 | 1.29 | 8.19 | 3.27 | 2.5 | 1028 | 30.9 | 31800 | A | A | GA | Inventive example |
| 76 | 1.04 | 5.09 | 2.13 | 2.4 | 1019 | 25.4 | 25900 | A | A | GI | Inventive example |
| 77 | 1.11 | 8.45 | 3.75 | 2.3 | 1064 | 29.4 | 31300 | A | A | GI | Inventive example |
| 78 | 1.19 | 5.97 | 2.47 | 2.4 | 984 | 25.7 | 25300 | A | A | GA | Inventive example |
| 79 | 0.97 | 5.66 | 2.44 | 2.3 | 996 | 26.1 | 26000 | A | A | GA | Inventive example |
| 80 | 1.37 | 12.94 | 4.26 | 3.0 | 1087 | 31.4 | 34200 | A | A | GA | Inventive example |
| 81 | 0.95 | 6.85 | 3.04 | 2.3 | 1207 | 25.4 | 30700 | A | A | GI | Inventive example |
| 82 | 1.35 | 5.83 | 2.44 | 2.4 | 1044 | 24.9 | 26000 | A | A | GA | Inventive example |
| 83 | 1.12 | 7.58 | 3.11 | 2.4 | 1031 | 26.1 | 27000 | A | A | GI | Inventive example |
| 84 | 0.98 | 5.34 | 2.46 | 2.2 | 1007 | 25.1 | 25300 | A | A | GI | Inventive example |

TABLE 4

| | | First heat treatment step | | | | Cold rolling step | Pickling step | Second heat treatment step | | | | Plating step | Alloying step |
|---|---|---|---|---|---|---|---|---|---|---|---|---|---|
| No | Steel | $H_2$ (%) | Dew point (° C.) | Heating temperature (° C.) | Holding time (s) | Rolling reduction (%) | Weight loss (g/m$^2$) | $H_2$ (%) | Dew point (° C.) | Heating temperature (° C.) | Holding time (s) | Al concentration (%) | Alloying temperature (° C.) |
| 85 | A | 5 | 10 | 690 | 18000 | 50 | 0.14 | 5.0 | −35 | 760 | 50 | 0.137 | 500 |
| 86 | A | 5 | −30 | 600 | 15000 | 50 | 0.22 | 10.0 | −30 | 750 | 100 | 0.187 | — |
| 87 | A | 10 | −20 | 560 | 15000 | 40 | 0.12 | 15.0 | −30 | 800 | 50 | 0.135 | 520 |
| 88 | B | 5 | −35 | 690 | 100 | 50 | 0.42 | 5.0 | −45 | 720 | 100 | 0.139 | 500 |
| 89 | B | 5 | −35 | 680 | 1000 | 50 | 0.19 | 5.0 | 0 | 700 | 50 | 0.132 | 500 |
| 90 | C | 5 | 10 | 690 | 20000 | 50 | 0.08 | 5.0 | −35 | 700 | 50 | 0.126 | 480 |
| 91 | C | 5 | −20 | 690 | 15000 | 50 | 0.01 | 5.0 | −35 | 730 | 100 | 0.134 | 500 |
| 92 | C | 5 | −40 | 680 | 15000 | 35 | 0.01 | 5.0 | −35 | 690 | 100 | 0.194 | — |
| 93 | C | 5 | −30 | 780 | 10000 | 50 | 0.26 | 0.01 | −35 | 690 | 100 | 0.129 | 480 |
| 94 | D | 5 | −35 | 690 | 20000 | 50 | 0.12 | 10.0 | 0 | 700 | 100 | 0.138 | 540 |
| 95 | D | 10 | −30 | 750 | 18000 | 50 | 0.72 | 10.0 | −35 | 880 | 100 | 0.138 | 500 |
| 96 | D | 5 | −35 | 690 | 15000 | 50 | 7.42 | 5.0 | −35 | 710 | 50 | 0.213 | — |
| 97 | D | 0.02 | −30 | 690 | 15000 | 50 | 0.08 | 5.0 | −35 | 710 | 50 | 0.131 | 520 |
| 98 | E | 5 | −30 | 690 | 10000 | 50 | 0.15 | 5.0 | −35 | 900 | 50 | 0.132 | 500 |
| 99 | E | 5 | −30 | 560 | 10000 | 50 | 0.42 | 5.0 | −35 | 700 | 100 | 0.137 | 500 |
| 100 | F | 10 | −30 | 900 | 10000 | 50 | 0.13 | 5.0 | −35 | 700 | 150 | 0.138 | 510 |
| 101 | F | 5 | −30 | 690 | 18000 | 50 | 0.19 | 15.0 | 0 | 710 | 50 | 0.138 | 510 |
| 102 | G | 5 | 20 | 690 | 18000 | 50 | 0.25 | 10.0 | −35 | 680 | 50 | 0.188 | — |
| 103 | G | 0.02 | −30 | 690 | 18000 | 50 | 0.12 | 5.0 | −35 | 680 | 50 | 0.130 | 460 |
| 104 | H | 5 | −30 | 690 | 10000 | 50 | 0.33 | 5.0 | −35 | 720 | 1200 | 0.131 | 500 |
| 105 | H | 5 | −20 | 690 | 10000 | 50 | 0.47 | 0.01 | −35 | 690 | 150 | 0.131 | 500 |
| 106 | I | 5 | −35 | 700 | 26000 | 50 | 0.18 | 5.0 | −35 | 800 | 150 | 0.138 | 490 |
| 107 | I | 5 | −35 | 700 | 100 | 50 | 0.15 | 5.0 | −35 | 690 | 100 | 0.138 | 490 |
| 108 | J | 10 | −35 | 690 | 18000 | 50 | 8.55 | 10.0 | −35 | 690 | 50 | 0.137 | — |
| 109 | J | 5 | −20 | 730 | 18000 | 50 | 0.49 | 10.0 | −35 | 850 | 100 | 0.129 | 560 |
| 110 | K | 5 | −20 | 710 | 10000 | 50 | 0.22 | 10.0 | −35 | 750 | 1500 | 0.131 | 500 |
| 111 | K | 5 | −30 | 540 | 18000 | 50 | 0.19 | 10.0 | −35 | 680 | 150 | 0.138 | 520 |
| 112 | L | 5 | −30 | 800 | 150 | 50 | 0.14 | 5.0 | −35 | 720 | 200 | 0.132 | 520 |
| 113 | AA | 5 | −30 | 700 | 18000 | 50 | 0.24 | 5.0 | −40 | 800 | 50 | 0.137 | 500 |
| 114 | AB | 5 | −30 | 680 | 15000 | 50 | 0.15 | 5.0 | −35 | 750 | 50 | 0.195 | — |

| | Within 5 μm Solute Mn concentration (%) | Average Mn mass | | Retained austenite/ferrite | Properties | | | Coating | | | |
|---|---|---|---|---|---|---|---|---|---|---|---|
| | | In retained austenite (%) | In ferrite (%) | | TS (MPa) | EL (%) | TS × EL | Surface appearance | Adhesion | Product | Remarks |
| No | | | | | | | | | | | |
| 85 | 1.10 | 6.52 | 3.44 | 1.90 | 632 | 38.2 | 24200 | C | C | GA | Comparative steel |
| 86 | 1.94 | 5.28 | 3.82 | 1.38 | 617 | 30.4 | 18800 | C | C | GA | Comparative example |

TABLE 4-continued

| | | | | | | | | | | |
|---|---|---|---|---|---|---|---|---|---|---|
| 87 | 2.11 | 5.88 | 3.46 | 1.70 | 612 | 29.5 | 18100 | C | C | GI | Comparative example |
| 88 | 1.97 | 3.22 | 2.46 | 1.31 | 812 | 20.3 | 16500 | C | C | GA | Comparative example |
| 89 | 1.79 | 4.29 | 2.08 | 2.06 | 811 | 35.4 | 28800 | C | C | GA | Comparative example |
| 90 | 0.99 | 6.71 | 3.56 | 1.88 | 1018 | 31.4 | 32000 | C | C | GA | Comparative steel |
| 91 | 2.17 | 6.69 | 3.22 | 2.08 | 995 | 31.8 | 31700 | C | C | GA | Comparative example |
| 92 | 2.44 | 6.49 | 3.14 | 2.07 | 1022 | 30.9 | 31600 | C | C | GI | Comparative example |
| 93 | 1.88 | 6.53 | 3.21 | 2.03 | 1103 | 28.7 | 31700 | C | C | GA | Comparative example |
| 94 | 2.18 | 6.75 | 3.16 | 2.14 | 1018 | 30.2 | 30800 | C | C | GA | Comparative example |
| 95 | 1.75 | 4.88 | 3.54 | 1.38 | 1012 | 18.4 | 18700 | C | C | GA | Comparative example |
| 96 | 2.13 | 6.57 | 3.18 | 2.07 | 1052 | 25.2 | 26600 | C | C | GA | Comparative example |
| 97 | 1.25 | 7.02 | 3.75 | 1.87 | 1034 | 24.8 | 25700 | C | C | GA | Comparative steel |
| 98 | 1.38 | 4.85 | 3.78 | 1.28 | 1208 | 14.5 | 17600 | C | C | GA | Comparative example |
| 99 | 3.26 | 5.08 | 3.94 | 1.29 | 1223 | 14.2 | 17400 | C | C | GA | Comparative example |
| 100 | 0.84 | 4.12 | 3.58 | 1.15 | 1243 | 13.8 | 17200 | C | C | GA | Comparative example |
| 101 | 1.84 | 8.11 | 3.85 | 2.11 | 1218 | 18.2 | 22200 | C | C | GA | Comparative example |
| 102 | 0.64 | 4.28 | 2.62 | 1.63 | 612 | 39.1 | 24000 | C | C | GI | Comparative steel |
| 103 | 0.81 | 4.08 | 2.11 | 1.93 | 604 | 40.2 | 24300 | C | C | GA | Comparative steel |
| 104 | 2.15 | 7.18 | 5.88 | 1.22 | 997 | 24.8 | 24800 | C | C | GA | Comparative example |
| 105 | 2.43 | 8.52 | 4.08 | 2.09 | 1008 | 25.6 | 25900 | C | C | GA | Comparative example |
| 106 | 1.44 | 12.51 | 7.26 | 1.72 | 1214 | 27.3 | 33200 | C | C | GA | Comparative steel |
| 107 | 7.52 | 10.23 | 8.11 | 1.26 | 1208 | 20.5 | 24800 | C | C | GA | Comparative example |
| 108 | 1.84 | 11.87 | 5.12 | 2.32 | 1345 | 22.4 | 30200 | C | C | GI | Comparative example |
| 109 | 1.34 | 8.24 | 4.66 | 1.77 | 1284 | 20.1 | 25900 | C | C | GA | Comparative example |
| 110 | 1.29 | 6.21 | 4.18 | 1.49 | 1108 | 26.1 | 29000 | C | C | GA | Comparative example |
| 111 | 1.87 | 5.18 | 4.22 | 1.23 | 995 | 25.5 | 25400 | C | C | GA | Comparative example |
| 112 | 4.18 | 7.47 | 4.38 | 1.71 | 1084 | 24.9 | 27000 | C | C | GA | Comparative example |
| 113 | 1.12 | 8.22 | 4.35 | 1.89 | 1194 | 15.8 | 18900 | C | C | GA | Comparative example |
| 114 | 2.21 | 16.21 | 14.51 | 1.12 | 1125 | 16.2 | 18300 | C | C | GI | Comparative example |

High-strength galvanized steel sheets of inventive examples all have a TS of 590 MPa or more, are excellent in formability, and are also excellent in surface appearance and coating adhesion. However, in comparative examples, at least one of properties such as surface appearance and coating adhesion is poor.

The invention claimed is:

1. A method for manufacturing a galvanized steel sheet with a tensile strength (TS) of 590 MPa or more, the method comprising:
   hot-rolling a steel slab to form a steel sheet, the steel slab having a composition comprising:
   C: 0.030% to 0.250%, by mass %,
   Si: 0.01% to 3.00%, by mass %,
   Mn: 2.00% to 10.00%, by mass %,
   P: 0.001% to 0.100%, by mass %,
   S: 0.0001% to 0.0200%, by mass %,
   N: 0.0005% to 0.0100%, by mass %,
   Ti: 0.005% to 0.200%, by mass %, and
   Fe and inevitable impurities;
   performing pickling on the steel sheet;
   performing a first heat treatment on the steel sheet in such a manner that the steel sheet is held in a temperature range of 650° C. to 850° C. for 600 s to 21,600 s in an atmosphere having an $H_2$ concentration of 0.1% by volume to 25.0 by volume and a dew point of −45° C. to 0° C. in such a state that a surface of the steel sheet is exposed;
   performing first cooling of the steel sheet;
   performing pickling on the steel sheet under such conditions that a pickling weight loss is 0.03 g/m² to 5.00 g/m² in terms of Fe;
   performing a second heat treatment on the steel sheet in such a manner that the steel sheet is held in a temperature range of 600° C. to 830° C. for 20 s to 900 s in an atmosphere having an $H_2$ concentration of 0.05% by volume to 25.0% by volume and a dew point of −10° C. or lower;
   performing second cooling of the steel sheet; and
   then performing galvanizing on the steel sheet,
   wherein a concentration of solute Mn at a depth of 5 μm or less from a surface of the steel sheet is 1.50% by mass or less,
   a value obtained by dividing an average mass percentage of Mn in retained austenite by an average mass percentage of Mn in ferrite is 2.0 or more, and
   at least one of (i) an x-ray fluorescence count of a number of Zn particles in a coating layer peeled from a portion of the galvanized steel sheet to which alloying is performed after performing the galvanizing is less than 5,000, and (ii) a coating layer disposed on a portion of the galvanized steel sheet to which no alloying is performed after performing the galvanizing does not peel off with a cellophane tape under a ball impact test carried out under conditions including a ball mass of 1.8 kg and a drop height of 100 cm.

2. The method for manufacturing the galvanized steel sheet with a tensile strength (TS) of 590 MPa or more according to claim 1, wherein the composition further comprises at least one element selected from:
   Al: 0.01% to 2.00%, by mass %,
   Nb: 0.005% to 0.200%, by mass %,
   B: 0.0003% to 0.0050%, by mass %,
   Ni: 0.005% to 1.000%, by mass %,
   Cr: 0.005% to 1.000%, by mass %,
   V: 0.005% to 0.500%, by mass %,
   Mo: 0.005% to 1.000%, by mass %,
   Cu: 0.005% to 1.000%, by mass %,
   Sn: 0.002% to 0.200%, by mass %,
   Sb: 0.005% to 0.100%, by mass %,
   Ta: 0.001% to 0.010%, by mass %,
   Ca: 0.0005% to 0.0050%, by mass %,
   Mg: 0.0005% to 0.0050%, by mass %, and
   REM: 0.0005% to 0.0050%, by mass %.

3. The method for manufacturing the galvanized steel sheet with a tensile strength (TS) of 590 MPa or more according to claim 1, wherein the composition comprises Si: 0.01% to 0.49%, by mass %.

4. The method for manufacturing the galvanized steel sheet with a tensile strength (TS) of 590 MPa or more according to claim 1, wherein the composition comprises Mn: 3.14% to 10.00%, by mass %.

5. The method for manufacturing the galvanized steel sheet with a tensile strength (TS) of 590 MPa or more according to claim 1, further comprising performing alloying on the steel sheet after performing the galvanizing.

6. The method for manufacturing the galvanized steel sheet with a tensile strength (TS) of 590 MPa or more according to claim 5, wherein the composition further comprises at least one element selected from:
Al: 0.01% to 2.00%, by mass %,
Nb: 0.005% to 0.200%, by mass %,
B: 0.0003% to 0.0050%, by mass %,
Ni: 0.005% to 1.000%, by mass %,
Cr: 0.005% to 1.000%, by mass %,
V: 0.005% to 0.500%, by mass %,
Mo: 0.005% to 1.000%, by mass %,
Cu: 0.005% to 1.000%, by mass %,
Sn: 0.002% to 0.200%, by mass %,
Sb: 0.005% to 0.100%, by mass %,
Ta: 0.001% to 0.010%, by mass %,
Ca: 0.0005% to 0.0050%, by mass %,
Mg: 0.0005% to 0.0050%, by mass %, and
REM: 0.0005% to 0.0050%, by mass %.

7. The method for manufacturing the galvanized steel sheet with a tensile strength (TS) of 590 MPa or more according to claim 1, wherein cold rolling is performed on the steel sheet at a rolling reduction of 30% or more after performing the first heat treatment and the first cooling.

8. The method for manufacturing the galvanized steel sheet with a tensile strength (TS) of 590 MPa or more according to claim 7, wherein the composition further comprises at least one element selected from:
Al: 0.01% to 2.00%, by mass %,
Nb: 0.005% to 0.200%, by mass %,
B: 0.0003% to 0.0050%, by mass %,
Ni: 0.005% to 1.000%, by mass %,
Cr: 0.005% to 1.000%, by mass %,
V: 0.005% to 0.500%, by mass %,
Mo: 0.005% to 1.000%, by mass %,
Cu: 0.005% to 1.000%, by mass %,
Sn: 0.002% to 0.200%, by mass %,
Sb: 0.005% to 0.100%, by mass %,
Ta: 0.001% to 0.010%, by mass %,
Ca: 0.0005% to 0.0050%, by mass %,
Mg: 0.0005% to 0.0050%, by mass %, and
REM: 0.0005% to 0.0050%, by mass %.

9. The method for manufacturing the galvanized steel sheet with a tensile strength (TS) of 590 MPa or more according to claim 7, further comprising performing alloying on the steel sheet after performing the galvanizing.

10. The method for manufacturing the galvanized steel sheet with a tensile strength (TS) of 590 MPa or more according to claim 9, wherein the composition further comprises at least one element selected from:
Al: 0.01% to 2.00%, by mass %,
Nb: 0.005% to 0.200%, by mass %,
B: 0.0003% to 0.0050%, by mass %,
Ni: 0.005% to 1.000%, by mass %,
Cr: 0.005% to 1.000%, by mass %,
V: 0.005% to 0.500%, by mass %,
Mo: 0.005% to 1.000%, by mass %,
Cu: 0.005% to 1.000%, by mass %,
Sn: 0.002% to 0.200%, by mass %,
Sb: 0.005% to 0.100%, by mass %,
Ta: 0.001% to 0.010%, by mass %,
Ca: 0.0005% to 0.0050%, by mass %,
Mg: 0.0005% to 0.0050%, by mass %, and
REM: 0.0005% to 0.0050%, by mass %.

11. A method for manufacturing a hot-rolled steel sheet for galvanized steel sheets with a tensile strength (TS) of 590 MPa or more, the method comprising:
hot-rolling a steel slab to form a steel sheet, the steel slab having a composition comprising:
C: 0.030% to 0.250%, by mass %,
Si: 0.01% to 3.00%, by mass %,
Mn: 2.00% to 10.00%, by mass %,
P: 0.001% to 0.100%, by mass %,
S: 0.0001% to 0.0200%, by mass %,
N: 0.0005% to 0.0100%, by mass %,
Ti: 0.005% to 0.200%, by mass %, and
Fe and inevitable impurities;
performing pickling on the steel sheet; and
then performing a heat treatment on the steel sheet in such a manner that the steel sheet is held in a temperature range of 650° C. to 850° C. for 600 s to 21,600 s in an atmosphere having an $H_2$ concentration of 0.1% by volume to 25.0% by volume and a dew point of −45° C. to 0° C. in such a state that a surface of the steel sheet is exposed,
wherein a concentration of solute Mn at a depth of 5 μm or less from a surface of the steel sheet is 1.50% by mass or less,
a value obtained by dividing an average mass percentage of Mn in retained austenite by an average mass percentage of Mn in ferrite is 2.0 or more, and
at least one of (i) an x-ray fluorescence count of a number of Zn particles in a coating layer peeled from a galvanized portion of the steel sheet to which alloying is performed after performing galvanizing is less than 5,000, and (ii) a coating layer disposed on a galvanized portion of the steel sheet to which no alloying is performed after performing galvanizing does not peel off with a cellophane tape under a ball impact test carried out under conditions including a ball mass of 1.8 kg and a drop height of 100 cm.

12. The method for manufacturing the hot-rolled steel sheet for galvanized steel sheets with a tensile strength (TS) of 590 MPa or more according to claim 11, wherein the composition further comprises at least one element selected from:
Al: 0.01% to 2.00%, by mass %,
Nb: 0.005% to 0.200%, by mass %,
B: 0.0003% to 0.0050%, by mass %,
Ni: 0.005% to 1.000%, by mass %,
Cr: 0.005% to 1.000%, by mass %,
V: 0.005% to 0.500%, by mass %,
Mo: 0.005% to 1.000%, by mass %,
Cu: 0.005% to 1.000%, by mass %,
Sn: 0.002% to 0.200%, by mass %,
Sb: 0.005% to 0.100%, by mass %,
Ta: 0.001% to 0.010%, by mass %,
Ca: 0.0005% to 0.0050%, by mass %,
Mg: 0.0005% to 0.0050%, by mass %, and
REM: 0.0005% to 0.0050%, by mass %.

13. The method for manufacturing the hot-rolled steel sheet for galvanized steel sheets with a tensile strength (TS) of 590 MPa or more according to claim 11, wherein the composition comprises Si: 0.01% to 0.49%, by mass %.

14. The method for manufacturing the hot-rolled steel sheet for galvanized steel sheets with a tensile strength (TS) of 590 MPa or more according to claim 11, wherein the composition comprises Mn: 3.14% to 10.00%, by mass %.

15. A method for manufacturing a cold-rolled steel sheet for galvanized steel sheets with a tensile strength (TS) of 590 MPa or more, the method comprising:
hot-rolling a steel sheet having a composition comprising:
C: 0.030% to 0.250%, by mass %,
Si: 0.01% to 3.00%, by mass %,
Mn: 2.00% to 10.00%, by mass %,
P: 0.001% to 0.100%, by mass %,
S: 0.0001% to 0.0200%, by mass %,
N: 0.0005% to 0.0100%, by mass %,
Ti: 0.005% to 0.200%, by mass %, and
Fe and inevitable impurities;
performing pickling on the steel sheet;
performing a heat treatment on the steel sheet in such a manner that the steel sheet is held in a temperature range of 650° C. to 850° C. for 600 s to 21,600 s in an atmosphere having an $H_2$ concentration of 0.1% by volume to 25.0 by volume and a dew point of −45° C. to 0° C. in such a state that a surface of the steel sheet is exposed;
performing cooling of the steel sheet; and
then performing cold rolling of the steel sheet at a rolling reduction of 30% or more,
wherein a concentration of solute Mn at a depth of 5 μm or less from a surface of the steel sheet is 1.50% by mass or less,
a value obtained by dividing an average mass percentage of Mn in retained austenite by an average mass percentage of Mn in ferrite is 2.0 or more, and
at least one of (i) an x-ray fluorescence count of a number of Zn particles in a coating layer peeled from a galvanized portion of the steel sheet to which alloying is performed after performing galvanizing is less than 5,000, and (ii) a coating layer disposed on a galvanized portion of the steel sheet to which no alloying is performed after performing galvanizing does not peel off with a cellophane tape under a ball impact test carried out under conditions including a ball mass of 1.8 kg and a drop height of 100 cm.

16. The method for manufacturing the cold-rolled steel sheet for galvanized steel sheets with a tensile strength (TS) of 590 MPa or more according to claim 15, wherein the composition further comprises at least one element selected from:
Al: 0.01% to 2.00%, by mass %,
Nb: 0.005% to 0.200%, by mass %,
B: 0.0003% to 0.0050%, by mass %,
Ni: 0.005% to 1.000%, by mass %,
Cr: 0.005% to 1.000%, by mass %,
V: 0.005% to 0.500%, by mass %,
Mo: 0.005% to 1.000%, by mass %,
Cu: 0.005% to 1.000%, by mass %,
Sn: 0.002% to 0.200%, by mass %,
Sb: 0.005% to 0.100%, by mass %,
Ta: 0.001% to 0.010%, by mass %,
Ca: 0.0005% to 0.0050%, by mass %,
Mg: 0.0005% to 0.0050%, by mass %, and
REM: 0.0005% to 0.0050%, by mass %.

17. The method for manufacturing the cold-rolled steel sheet for galvanized steel sheets with a tensile strength (TS) of 590 MPa or more according to claim 15, wherein the composition comprises Si: 0.01% to 0.49%, by mass %.

18. The method for manufacturing the cold-rolled steel sheet for galvanized steel sheets with a tensile strength (TS) of 590 MPa or more according to claim 15, wherein the composition comprises Mn: 3.14% to 10.00%, by mass %.

* * * * *